United States Patent
Kundu et al.

(10) Patent No.: US 7,631,808 B2
(45) Date of Patent: Dec. 15, 2009

(54) METHOD AND APPARATUS FOR DETECTING SUSPICIOUS ACTIVITY USING VIDEO ANALYSIS

(75) Inventors: Malay Kundu, Lexington, MA (US); Vikram Srinivasan, Lowell, MA (US); Joshua Migdal, Medford, MA (US); Xiaowei Chen, Billerica, MA (US)

(73) Assignee: Stoplift, Inc., Cambridge, MA (US)

( * ) Notice: Subject to any disclaimer, the term of this patent is extended or adjusted under 35 U.S.C. 154(b) by 25 days.

(21) Appl. No.: 11/393,370

(22) Filed: Mar. 29, 2006

(65) Prior Publication Data

US 2006/0243798 A1 Nov. 2, 2006
US 2007/0057049 A9 Mar. 15, 2007

Related U.S. Application Data

(63) Continuation-in-part of application No. 11/157,127, filed on Jun. 20, 2005, now Pat. No. 7,516,888.

(60) Provisional application No. 60/581,559, filed on Jun. 21, 2004, provisional application No. 60/627,862, filed on Nov. 15, 2004, provisional application No. 60/666,081, filed on Mar. 29, 2005.

(51) Int. Cl.
*G06K 15/00* (2006.01)
*G06F 17/00* (2006.01)
*G06F 7/08* (2006.01)

(52) U.S. Cl. ............... 235/383; 235/375; 235/381
(58) Field of Classification Search ............... 235/375, 235/383, 385, 381; 705/22–24
See application file for complete search history.

(56) References Cited

U.S. PATENT DOCUMENTS

| 5,745,036 | A * | 4/1998 | Clare ................ 340/572.1 |
| 5,965,861 | A * | 10/1999 | Addy et al. ............ 235/383 |
| 7,049,965 | B2 * | 5/2006 | Kelliher et al. ........ 340/572.4 |
| 7,118,026 | B2 * | 10/2006 | Harris et al. ............ 235/375 |
| 7,416,118 | B2 * | 8/2008 | Throckmorton et al. ..... 235/383 |

* cited by examiner

*Primary Examiner*—Thien M. Le
*Assistant Examiner*—April A Taylor
(74) *Attorney, Agent, or Firm*—Chapin IP Law, LLC

(57) ABSTRACT

A system detects a transaction outcome by obtaining video data associated with a transaction area and analyzing the video data to obtain at least one video transaction parameter concerning transactions associated with the transaction area. The transaction area can be a video count of items indicated in the video data as detected by an automated item detection algorithm applied to the video data. The system obtains at least one expected transaction parameter concerning an expected transaction that occurs in the transaction area, such as a scan count of items scanned at a point of sale terminal. The system automatically compares the video transaction parameter(s) to the expected transaction parameter(s) to identify a transaction outcome that may indicate fraudulent activity such as sweethearting in a retail environment.

33 Claims, 13 Drawing Sheets

METHOD AND APPARATUS FOR DETECTING SUSPICIOUS ACTIVITY USING VIDEO ANALYSIS

CONTINUATION IN PART AND PROVISIONAL CLAIMS TO PRIORITY

1: This application is a CONTINUATION-IN-PART APPLICATION of earlier filed co-pending entitled "METHOD AND APPARATUS FOR AUDITING TRANSACTION ACTIVITY IN RETAIL AND OTHER ENVIRONMENTS USING VISUAL RECOGNITION", having U.S. Ser. No. 11/157,127, Filed Jun. 20, 2005 now U.S. Pat. No. 7,516,888, which in turn claims priority to "METHOD AND APPARATUS FOR AUDITING TRANSACTION ACTIVITY IN RETAIL AND OTHER ENVIRONMENTS USING VISUAL RECOGNITION", Filed Jun. 21, 2004, having U.S. Ser. No. 60/581,559 and "METHOD AND APPARATUS FOR DIGITAL ARCHIVING OF VIDEO", Filed Nov. 15, 2004, U.S. Ser. No. 60/627,862.

2: This application further claims the benefit of the filing date of Provisional Patent Application entitled "METHOD AND APPARATUS FOR DETECTING ITEM PASS THROUGH & MISIDENTIFICATION", having U.S. Ser. No. 60/666,081, Filed Mar. 29, 2005 The entire disclosure, teachings and contents of this provisional application are hereby incorporated by reference herein.

BACKGROUND

Retail establishments commonly utilize point of sale or other transaction terminals, often referred to as cash registers, to allow customers of those establishments to purchase items. As an example, in a conventional department store, supermarket or other retail establishment, a customer collects items for purchase throughout the store and places them in a shopping cart, basket, or simply carries them to a point of sale terminal to purchase those items in a transaction. The point of sale terminal may be staffed with an operator such as a cashier who is a person employed by the store to assist the customer in completing the transaction. In some cases, retail establishments have implemented self-checkout point of sale terminals in which the customer is the operator. In either case, the operator typically places items for purchase on a counter, conveyor belt or other item input area. The point of sale terminals include a scanning device such as a laser or optical scanner device that operates to identify a Uniform Product Code (UPC) label or bar code affixed to each item that the customer desires to purchase. The laser scanner is usually a peripheral device coupled to a computer that is part of the POS terminal. To scan an item, the operator picks up each item, one by one, from the item input area and passes that item over a scanning area such as glass window built into the counter or checkout area to allow the laser scanner to detect the UPC code. Once the point of sale computer identifies the UPC code on an item, the computer can perform a lookup in a database to determine the price and identity of the scanned item. Alternatively, in every case where the operator can scan the item, the operator may likewise enter the UPC or product identification code into the terminal manually or through an automatic product identification device such as an RFID reader. The term "scan" is defined generally to include all means of entering transaction items into a transaction terminal. Likewise, the term "scanner" is defined generally as any transaction terminal, automated and/or manual, for recording transaction information.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a downstream conveyor belt or other area for retrieval of the items by the customer or for bagging of the items into a shopping bag. Once all items in the transaction are scanned in this manner, the operator indicates to the point of sale terminal that the scanning process is complete and the point of sale terminal displays a total purchase price to the customer who then pays the store for the items purchased in that transaction.

SUMMARY

Conventional systems that provide for purchase of items using a scanner or other automated identification of items via code suffer from a variety of deficiencies. In particular, operation of such systems can be compromised either knowingly or unknowingly by an operator in a manner that allows a customer to receive possession of one or more items without paying for them. In particular, such systems are susceptible to "pass-throughs", also know as "sweethearting" in which an operator purposefully or accidentally fails to scan an item as that item moves through the transaction area. In such cases, the POS system never detects the un-scanned item and the item is thus never totaled into the purchase price. In such cases, the customer effectively receives the item for free. Retail chains lose millions of dollars a year to operator error or fraudulent activity of this nature.

In a non-fraudulent example, an operator may unknowingly pass an item through the scanning area during a transaction and place the item into the item output area such as a downstream conveyor belt, but no scan of the item took place. Perhaps the operator was not paying attention and did not notice (or did not care) that the scanner failed to beep during scanning of an item.

As an example of sweethearting that represents fraud on the retail establishment, an operator who may be assisting a customer who is personally known to the operator (e.g. a friend or conspirator of the operator) intentionally causes the POS system to either not scan the item as the operator moves the item through the transaction area, such as by covering the UPC label with their hand or moving the UPC code out of range of the scanner. In such situations, the item is included with other items that may or may not have also been scanned, and the customer or operator continues along as if nothing wrong happened. After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of all scanned and entered items. After paying, the customer removes all items, scanned/entered and un-scanned, from the store, having only paid for those items that were scanned or entered.

In another fraudulent example know as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop conventional techniques for detecting fraudulent or accidental operator error in use of POS terminals. The conventional systems in the field of detection of pass-through and sweehearting provide for the detection of abnormally long "scan-gaps". A "scan-gap" is the amount of time between consecutive scans at the point of sale terminal. When an item is passed through without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric and therefore conventional systems that attempt to use scan gaps as a method for detecting fraudulent activity are prone to problems.

In contrast, the system disclosed herein uses video data analysis techniques as will be explained to detect activity such as sweethearting or pass-throughs. In particular, the system disclosed herein detects incidents of theft or loss of inventory at the cash register, POS or other transaction terminal when an operator such as a customer or store employee passes one or more items around the scanner (or RFID reader) without being scanned, or when the operator scans or manually enters an incorrect code into the transaction terminal for an item. The system disclosed herein can also detect items which may be mislabeled with an incorrect bar code to be misread by the scanner or entered as the wrong item by the operator. Some embodiments utilize video analysis in conjunction with transaction scan data concerning items that were actually scanned by the POS terminal.

It is to be understood that point-of-sale terminals or cash registers that utilize scanning are only examples of transaction terminals and the system is not limited to detecting fraud in only retail environments. Additionally, scanning is not limited to laser scanning with a fixed scanner device, but can include handheld scanners, or Radio Frequency Identification (RFID) readers. The system is even applicable in situations where an operator manually enters a code or other item identification via a keyboard into the transaction terminal. The system disclosed herein is generally applicable to any environment where transaction data is available for comparison with video data associated with that transaction.

As an example, a system that utilizes RFID tags to identify items can benefit from the system disclosed herein. As an example, toll booth collection systems provide video data of vehicles traveling through the toll booths and provide for operators such as people, or automated scanners such as RFID vehicle transceiver reading systems, to collect toll fees from vehicles traveling on a highway. Fraud may occur is such systems, for example, if a vehicle is equipped with an improper transceiver (e.g. a truck is equipped with a car transceiver). Also, the terminal operator may refer to either store employee or customer, as in situations such as self-checkout transaction terminals.

More specifically, the system disclosed herein includes methods and apparatus for detecting a transaction outcome such as suspicious activity related to a transaction (e.g., purchase, refund, void, etc.) of items by a customer at a transaction terminal. The system obtains video data associated with a transaction area. The video data may be obtained, for example, from an elevated camera focused on a cash register check out or other transaction area in a supermarket or other retail establishment. The system applies an automated machine video analysis algorithm that is disclosed as part of the system to analyze at least a portion of the video data to obtain at least one video parameter concerning at least a portion of a transaction associated with the transaction area. As an example, the system can analyze the video data to track (e.g. identify the presence of) items involved in the transaction in the transaction area. This process can automatically identify the presence of an item involved in the transaction from the video data analysis. This can be done, for example, by automatically detecting item activity in the transaction area and/or detecting operator activity in the transaction area. Detection of item presence can include detecting removal of an item from a region of interest in the transaction area and/or detecting introduction of an item into a region of interest in the transaction area.

In one configuration, the video transaction parameter is reduced to a video count of how many items the video analysis algorithm identified as having been processed by the operator in the transaction. As an example, an item is processed when an operator moves the item through the transaction area, whether or not the item was scanned or entered. Thus the video count can detect and count items that are both processed and scanned/entered and items that are processed, but not scanned/entered.

In another configuration, the video transaction parameter is a sequence of detection events produced from one or more detectors performing analysis of all or part of the video data. A detector is generally an automated image processing algorithm applied to a region of interest of the video data. For example, the video data may cover a large portion of the transaction area that includes the operator (e.g. store employee and/or customer), an item input region, a scan region, and an item output region. A detector can analyze all or a portion of this area, such as just the input conveyor belt region of the video data of a point of sale terminal. An image isolation and comparison process can be applied to frames of the video data for one or more regions of interest to detect the presence of an item being introduced or removed from this region of interest. When an item is detected in this manner, a detection event is produced indicating the presence of an item, time of detection, and other characteristics such as the size of the item. There may be more than one region of interest and the sequence of events may include many events from different detectors, or there may be a single detector producing a single set of events for just one region of interest. By analyzing the video data in this manner, the system is able to detect, from video analysis, the presence of individual items in the transaction. In some configurations, the system can determine how many items were visually processed in the entire transaction.

The system obtains at least one transaction parameter originated from the transaction terminal associated with the transaction area. The expected transaction parameter in one configuration is a transaction count or other item presence indication obtained from the transaction data produced by the transaction terminal (e.g. point of sale terminal). As each item is scanned or otherwise identified, data is sent from the scanner device to a processor in the transaction terminal. The system disclosed herein accesses this data (this can be done in various ways, as will be explained) either on a scan-by-scan basis, or as a collective set of data from a database, to determine the presence (and in some cases the identity) of a number of items processed by the transaction.

Using the combination of video analysis in comparison with transaction data, the system can determine if the presence of the item identified in the analysis of the video data has a corresponding presence in the transaction data, and if not, identifies the suspicious activity. As an example, for each detector, the system can compare the set of detection events for that detector to at least a portion of the transaction data to identify at least one apparent discrepancy in a number of items detected by that detector from a number of items indicated in the portion of transaction data. Transaction data such as transaction count (e.g. scan count) or transaction item identity thus represents the presence of an item or a number of items scanned (for an entire transaction), while the detection event data or video count from the video analysis represents the presence (or number) of items that the operator causes to move through the transaction area. Many other embodiments are disclosed herein, details of which are provided in the detailed description section.

Other embodiments of the invention include any type of computerized device, workstation, handheld or laptop computer, POS or transaction terminal, or the like configured with software and/or circuitry (e.g., a processor) to process any or all of the method operations disclosed herein. The system may include the video camera(s) for obtaining the video, or the system may be a standalone computer that receives as input video data and scan data collected from one or more POS terminals in one or more retail locations. In other words, a computerized device or a processor that is programmed or configured to operate in any manner as explained herein is considered an embodiment of the invention. The system need not include the video camera and POS terminal, but instead may be an offsite computer system operated by a security service provider that receives the video and transaction data.

The processing may be done in real-time as the video and transaction data are collected to identify fraudulent or suspicious activity that may have just occurred (and may include notifying a security officer who can approach the operator and inspect the transaction items and receipt to determine if fraud has occurred), or alternatively, the processing may be done at some point after video and transaction data are collected for one or more transactions (i.e. may be post-processed). If post-processed, the identity of the operator can be maintained and tracked and a history of suspicious activities associated with that operator can be accumulated. During subsequent analysis of transactions for that operator (operators log into a POS terminal with a unique identity, and thus all transactions that the operator performs can be associated with that operator), the system disclosed herein can take into account the history for that operator to adjust a suspicion level assigned to the transaction outcome. Thus, an initial suspicion outcome may not be flagged as fraudulent, but if a second, third, fourth transaction outcome in a certain amount of time (e.g. over several hours, days, etc.) is detected for that same operator, the video associated with those transactions can be automatically identified and forwarded for review by another means, such as human review to confirm fraudulent activity is present.

In one configuration, transaction data is processed for many transactions from one or more POS terminals for one or more retails locations, and those transactions that are processed as explained herein that result in an indication of fraudulent or suspicious activity are flagged and the video data for only those transactions can then be further reviewed using other techniques, such as human review, to confirm the fraudulent or suspicious activity as initially identified by the automated (i.e. non-human or machine-based) processing explained herein. Further variations and alternative embodiments will be explained more fully in the detailed description section below.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention can be embodied strictly as a software program, as software and hardware, or as hardware alone such as within a processor, or within an operating system. Example embodiments of the invention may be implemented within computer systems, processors, and computer program products and/or software applications manufactured by Stoplift, Inc. of Burlington, Mass., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

The system disclosed herein generally performs video counting or identification of items involved with transactions, as captured in video data, and compares this item identification information with transaction data obtained from a transaction terminal such as a point-of-sale register to identify situations that are suspicious and may indicate fraudulent activity or operator error. By obtaining video data originating from at least one video camera that monitors a transaction area, the system can automatically (i.e. no human involvement needed) analyze the video data to track items involved in a transaction in the transaction area. Using this information, the system can compare the video analysis of the tracked items to transaction data produced from a transaction terminal to identify suspicious activity.

Figure 1:
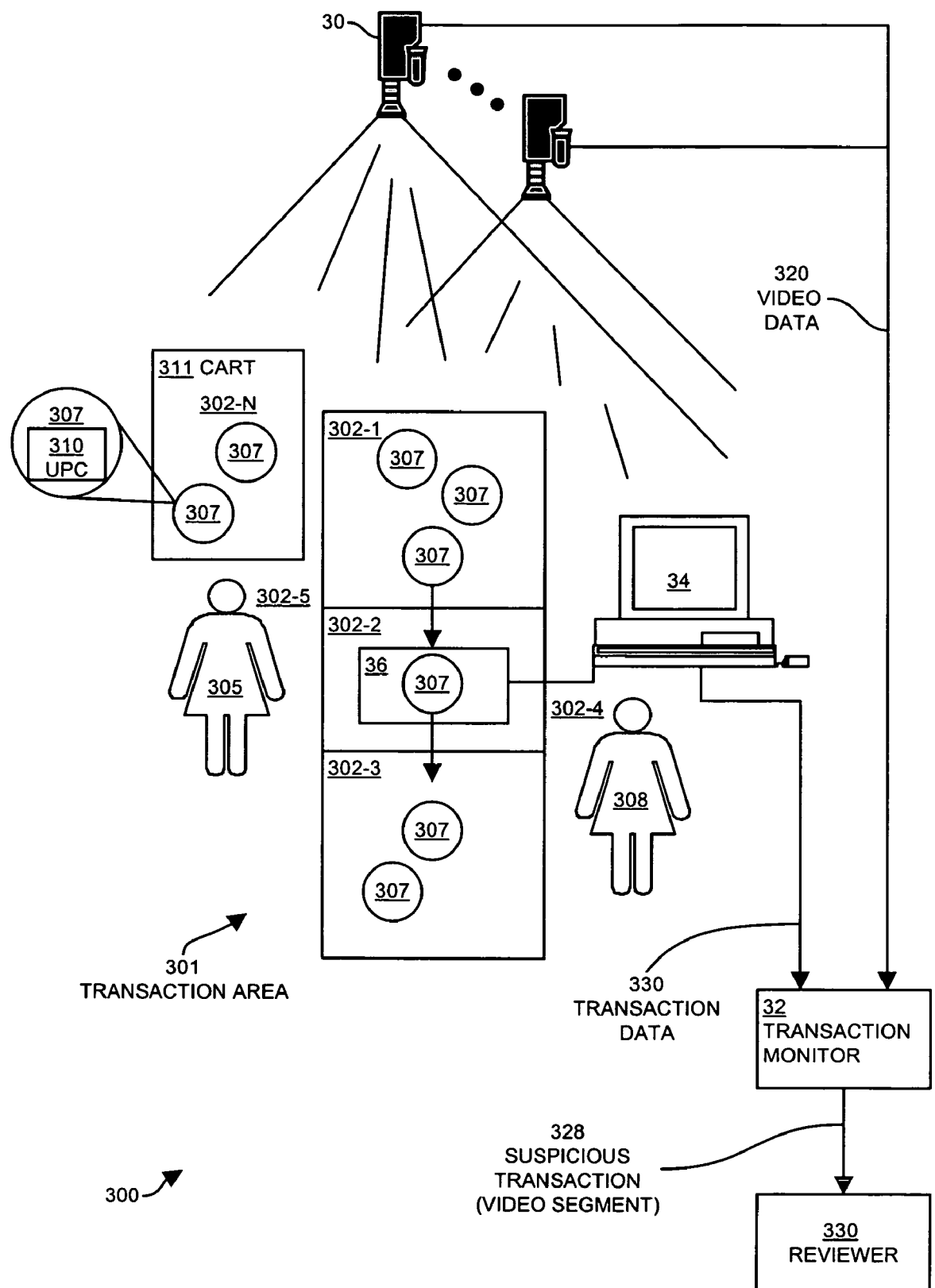
FIG. 1 illustrates an example configuration of a network environment that includes a video surveillance system and computer system configured with a transaction monitor configured as disclosed herein.

FIG. 1 is an illustration of an example environment 300 suitable for use in explaining example embodiment disclosed herein. Example environment 300 depicts a retail establishment in which customers 305 can purchase items 307. A transaction terminal 34 such as a point-of-sale terminal or cash register is under control of an operator 308 such as a store employee to allow the customer 305 to purchase the items 307. The transaction terminal 34 includes a scanning device 36 that is able to detect and scan or otherwise read item identities 310, such as UPC barcode symbols or RFID tags affixed to each item 307 when those items 307 are brought within a predetermined proximity of the scanner device in the 36.

In a typical operation of the environment 300, the customer 305 approaches the transaction area 301 with a set of items 307 to be purchased. The items 307 may be contained, for example, with a shopping cart 311 or other item carrier transported by the customer 305 to the transaction area 301. Alternatively, the customer 305 may carry the individual items 307 to the transaction area 301. To make the purchase of the items 307, the customer 305 removes the items 307 from shopping cart 311 (or from their hands if carrying the items) and places the items into an item input region generally designated as region 302-1 within the transaction area 301. The item input region 302-1 may be a conveyor belt, countertop or other surface area onto which items to be purchased are placed prior to being detected and read by the scanner device 36 of the transaction terminal 34.

The operator 308 such as a store employee interacts with the transaction terminal 34 by logging in or otherwise activating the transaction terminal 34. This process may involve the operator 308 providing a unique operator identity to the transaction terminal 34. During operation of the transaction terminal 34 by the operator 308, the body of the operator 308 generally remains within an operator region 302-4 of the transaction area 301. Once logged in, the operator 308 can begin selecting items for purchase 307 within the item input region 302-1, such as by picking up the individual items 307 by hand. The operator 308 passes each item 307 from the item input region 302-1 over the scanner device 36 generally located within an item read region 302-2. Assuming proper (i.e., non-fraudulent and non-error) operator operation, the operator 308 positions the item 307 such that the item identities 310 affixed to the item can be detected and scan or read by the scanner device 36. In response to the scanner device 36 detecting an item identity 310 of the item 307 just scanned, the transaction terminal 34 register has the item 307 as an item to be purchased and usually produces a notification to the operator 308 such as a beeping noise or tone to indicate that the item 307 has been successfully identified. In response to the notification, the operator 308 moves the item 307 into the item output region 302-3 which may be another countertop, downstream conveyor belt or the like that holds items 307 to have been successfully scanned or read by or entered into the transaction terminal 34.

The operator 308 repeats this process for each individual item 307 such that all items 307 to be purchased are moved from the item input region 302-1, over or through the item read region 302-2 (during which scanning of the item takes place) and into the item output region 302-3. In some cases, items 307 may not contain an affixed item identity 310 such as fruit, vegetables or the like. In such cases, after removal of the item 307 from the item input region 302-1, the operator 308 manually enters the item identity into the transaction terminal 304 a keyboard or other manual input device to allow the transaction terminal 34 to register the item 307. In this manner, after all items 307 have been identified to the transaction terminal 34, the operator 308 can indicate to the transaction terminal 34 that the transaction is complete and the transaction terminal 34 calculates the total price of the items 307 to be purchased. The customer 305 then provides payment in that amount to the operator 308 and proceeds to remove the items 307 from the item output region 302-3 for transport out of the retail establishment.

As illustrated in FIG. 1, the environment 300 further includes a transaction monitor 32 configured in accordance with embodiments of the invention to detect suspicious activity related to a transaction. The environment 300 also includes a video source 30 such as one or more overhead video cameras that capture video of the transaction area 301. Typically, the video source and will 30 is mounted in an elevated position sufficiently above the transaction area 301 to cover and capture video from the various regions 302. The transaction monitor 32 in this example receives, as input, video data 320 from the video source 30 as well as transaction data 34 from the transaction terminal 34. While the example environment 300 illustrates the transaction monitor 32 as receiving a transaction data 330 and video data 320 directly from the video source 30 and the transaction terminal 34, is to be understood that the transaction monitor 32 may receive these inputs and either real-time or any later time after processing of items or entire transactions by operator 308 is complete. Additionally, it is not required that the transaction monitor 32 receive the transaction data 330 and video data 320 directly from the video source 30 and transaction terminal 34. In an alternative configuration, these inputs can be received from a videotape machine (or from digital recorded media) or from the transaction database maintained by another computer system besides the transaction terminal 34. The video source 30 may thus be a real-time source such as a camera, or a delayed source such as a recording device such as a VCR or DVR. The transaction terminal 34 likewise may provide real-time transaction data directly from a POS (e.g., cashier terminal or scanner) or the transaction data may be delayed data from a transaction log database in which POS data is stored.

In operation of the system disclosed herein, the transaction monitor 32 operates to identify suspicious activity associated with the transaction area 301 such as sweethearting or pass-through activities, by comparing the video data 320 and corresponding transaction data 330 in order to identify and report suspicious activity. Generally, this entails the transaction monitor 32 collecting video data 320 from the transaction area 301 including the transaction terminal 34 in which customers 305 purchase items 307 during a transaction. The video source 30 such as a camera is preferably mounted in an elevated position above the transaction area 301 to allow video capture of regions 302 from above, though the system is not limited as such.

Generally, the transaction monitor 32 applies automated (i.e. non-human) video analysis to at least a portion or segment of the overhead video data 320 to detect the presence of at least one item 307 associated with the transaction. The transaction monitor 32 compares the presence of the item associated with the transaction from the video data (automatically detected by image processing techniques as explained herein) to transaction data 330 indicating items actually purchased by the customer at the transaction terminal (i.e. items 307 read or scanned by the terminal 34) to identify items in possession of the customer 305 that were not purchased at the transaction terminal (i.e. that were passed through the transaction area 301 without being scanned or entered into or read by the transaction terminal 34). The discrepancy between the presence of one or more items identified via automated processing of the video data 320 in comparison to items identified within the transaction data 330 indicates suspicious activity that the system disclosed herein can detect. The suspicious activity may be the result of operator error on behalf of the operator 308, or actual fraudulent activity that may include sweethearting or pass-throughs.

Depending upon the configuration, the transaction monitor 32 can analyze all or a portion of the video data captured from the transaction area to automatically detect items based, for example, on activity of objects that pass through the transaction area, activity of objects within a specific region of interest within the transaction area, activity of objects within a plurality of specific regions of interest within the transaction area, activity of objects entering into specific regions of interest within the transaction area and/or activity of objects exiting the specific regions of interest within transaction area.

Analysis of all or a portion of the video data produces, in one configuration, a set of detection events indicating detection of one or more items by at least one detector within at least one region of interest 302 of at least one portion of the video data. Depending upon the embodiment, the transaction monitor 32 can detect item detection from video analysis in only one region of interest 302, or in many regions 302. Notice in FIG. 1 that the transaction area 301 is divided or enumerated into several regions 302-1 through 302-N. Each of these areas or regions can be considered a region of interest 302 and the video data 320 can capture activity in some, all or only one of these areas that may be indicative of an item involved in the transaction.

The transaction monitor 32 applies a detector to perform image processing in a region of interest. The detector is generally an image processing algorithm that can detect the presence of an item in that region. Item presence can be detected, for example, by applying a detector processing to the input item region 302. For each detector (one or more), the transaction monitor 32 compares the set of detection events for that detector to at least a portion of transaction data (i.e. the portion that contains transaction information that coincides with the video data) to identify at least one apparent discrepancy in a number of items detected by that detector from a number of items indicated in the portion of the transaction data. The transaction monitor 32 can identify an overall suspicion level for the transaction based on apparent discrepancies identified by the detectors(s).

In some configurations, video processing or analysis includes dividing the transaction area 301 into a plurality of regions (e.g. 302-1 and 302-3) through which objects move in sequence during at least a portion of a transaction. The transaction monitor 32 can perform automated video detection of an item as the items move through the plurality of regions in a sequence to obtain a pattern represented by one or more video parameters. The pattern thus represents video events of items that moved through the regions during all or part of a transaction. The transaction monitor 32 can obtain transaction data 330 identifying items detected by the transaction terminal 34 during the portion of the transaction that corresponds to the video data that is analyzed, and can automatically comparing the video parameter to the transaction parameter by determining if the pattern representing video events of items from all or part of the transaction indicates a discrepancy from the transaction data identifying items detected by the transaction terminal during all or the same part of the transaction. If a discrepancy exists, the transaction monitor 32 identifies the transaction outcome to be a suspicious transaction.

By having different regions, sequences of different detection events can be used to identify existence of an item in the video data. In such cases, the transaction monitor 32 can concurrently compare sets of detection events from detectors with the transaction data to identify a discrepancy in a number of items processed in the transaction area. For example, performing automated video detection of the items can include identifying a removal event in an item input region 302-1 that indicates the operator 308 has removed an item 307 from the item input region 302-1, and can also include identifying an introduction event in an item output area that indicates an operator has placed an item into the item output area. Thus a sequence of events such as removal, introduction, removal introduction, and so forth can be produced from the video analysis if multiple regions of video data are monitored. This sequence can be time synchronized with transaction data indicating, for example, scans of items, so that a legitimate pattern appears as removal, scan, introduction, removal, scan, introduction and so forth, whereas a suspicious pattern might appear as removal, scan, introduction, removal, introduction. Notice the second scan event is not present, indicating a potential fraudulent or otherwise suspicious activity. By applying an automated machine-based video analysis technique to detect a video event of an item associated with the transaction area, and by comparing this with transaction data indicating transaction events of items associated with the transaction area, the transaction monitor 32 can determining if the video event is not identified as a transaction event in the transaction data, and in response, can identify a specific segment 328 of the video data that indicates where the video event not identified as a transaction event exists.

As shown in FIG. 1, once suspicious activity is identified, the transaction monitor 32 can identify and transmit the specific segment of video data that indicates where the video event that is not identified as a transaction event exists (i.e. in the video clip 328) to a reviewer to review the segment of video data 328 to review the suspicious activity of an operator with respect to purchase of items during the transaction.

In one configuration, the system disclosed herein provides an approach of actual counting of items or item detection events and is a more robust and accurate method of identifying incidents of items being passed through the transaction without being scanned. The system is unaffected by scan delays and since the system can determine that more items were part of a transaction than were scanned, the system can serve as a very clear indicator that theft or error on behalf of the operator has occurred.

Another kind of error, independent of item detection comparisons, is the misidentification of items. This may be due to fraud such as "ticket or label switching" where the barcode code or other item identity 310 may be overlaid with a bar code from lesser-priced item or "discounting" where the operator 308 intentionally manually enters a code or item identity into the transaction terminal 34 for a lesser priced item. In one configuration, the system disclosed herein provides an approach of isolating the item images for comparison directly from video of typically performed transactions. In such configurations, the transaction monitor 32 can perform image comparison to determine if an image of an item associated a detection event (e.g. an event indicating presence of an item in video data) substantially matches a previously stored image of an item. If the images do not substantially match, the transaction monitor 32 can identify the transaction as potentially including a label-switching event indicating potential suspicious activity. Because this approach allows the operator 308 to handle the item 307 normally, it does not require alteration of the manner in which transactions are typically performed. The system also does not impact or slow down the operator's performance of the transaction. This is of particular importance to professional operators as they are assessed on their speed of performance. Because the operator is not asked to alter his or her behavior, the system can be put in place to detect dishonest employees without their knowledge that anything new has been put in place.

Discussed below are a series of flow charts of various embodiments disclosed herein. It is to be understood that these are example embodiments provided to illustrate certain operations of certain configurations, and are not intended to cover all variations of the system disclosed herein.

Figure 2:
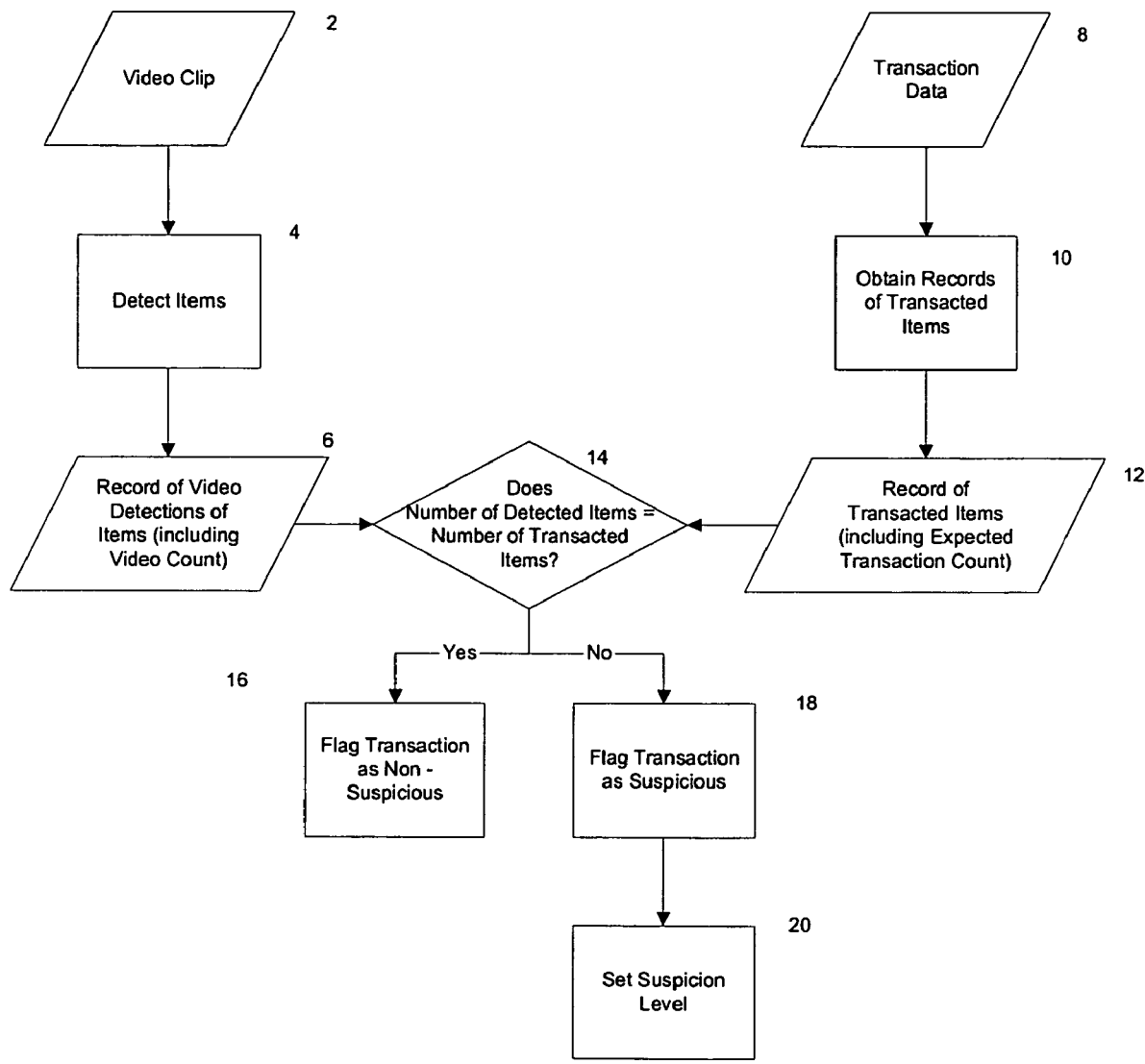
FIG. 2 is a flow chart of operation of one configuration of processing of the transaction monitor to detect pass-through activity within the transaction area.

FIG. 2 is a flow chart of operation of one configuration of processing of the transaction monitor 32 to detect pass-through activity within the transaction area. In this example configuration, the transaction monitor 32 obtains video data originating from at least one video camera that monitors a transaction area 301. The video clip 2 from video data 320 for at least a portion of one transaction and the corresponding transaction data 8 (from transaction data 330 in FIG. 1) for that transaction are analyzed to track items 307 involved in the transaction in the transaction area 301. Any time span of video data 320 and corresponding transaction data 330 may be handled (i.e., a portion of or more than one transaction), but for the sake of clarity and simplicity, this example will discuss one transaction being handled at a time.

In one configuration, identifying the presence of an item can be done using an area differential technique. In this technique, the transaction monitor 32 defines a region of interest within the transaction area, such as the input item region 302-1. For video of this region, the transaction monitor 32 operates a detector to automatically identify a first frame of video data (i.e. taken at a first time) that indicates a first set of items in the region of interest 302-1. This may be, for example, the initial set of items 307 placed in that area 302-1 by the customer 305 for purchase. Thereafter, the transaction monitor 32 automatically identifies a second frame of video data (i.e. captured as a second or later time) that indicates a second set of items in the region of interest 302, but for which the first set of items is visually distinct from the second set of items. This may be due to the removal of an item from the region 302-1 by the operator 308. The transaction monitor 32 can automatically indicate the visual distinctness of the first set of items from the second set of items as an event indicating an item existed within the region of interest 302-1 of the video data.

In step 10, the transaction monitor 32 obtains transaction data associated with the transaction terminal 34 associated with the transaction area 301. The transaction data indicates if the item 307 was registered as a purchase item with the transaction terminal 34.

In step 14, the transaction monitor 32 compares the video analysis of the tracked items to transaction data produced from a transaction terminal to identify suspicious activity. In one configuration, the transaction monitor 32 identifies suspicious activity when the transaction data is missing transaction data for an item for which an event indicates the item existed within the region of interest 302. This is an event-based comparison to associate each video detection event with a transaction event from the transaction data.

In another configuration of FIG. 2, the video clip 2 is analyzed in step 4 to visually detect the presence of items 307 actually involved in the transaction (event detection can be used). The transaction monitor 32 analyzes at least a portion of the video data to obtain at least one video parameter concerning at least a portion of a transaction associated with the transaction area 301. The video parameter may thus be a video count of items whose presence was detected. The transaction monitor 32 also obtains at least one transaction parameter originated from a transaction terminal 34 associated with the transaction area. The transaction monitor 32 in step 10 analyzes the transaction data 330 to obtain records of items 307 involved in the transaction. From these records can be determined an expected count of items reflected in the transaction data. In step 14, the transaction monitor 32 compares the actual or video count 6 against the expected, scan or transaction count 12. If the counts do match, then the transaction monitor 32 can flag the transaction as non-suspicious as in step (16). If the counts do not match, then the transaction monitor 32 flags the transaction as suspicious (e.g. potentially fraudulent) in step 18.

As explained above, the transaction monitor 32 identifies a video count of items detected within the transaction area using video analysis and identifies a transaction count of items within the transaction area by analyzing transaction data associated with at least a portion of the transaction. By comparing the video count to the transaction count, if the video count is different from the transaction count, the transaction monitor 32 can indicate a transaction outcome that represents suspicious activity, such as a fraudulent transaction or operator error. Depending upon the configuration, the transaction monitor 32 may provide additional information such as a suspicion level based on a metric such as the difference between the actual count and expected count.

In certain configurations, other information can be used to rank a suspicion level as being low, or high, or in a range. As an example, in a retail environment, each cashier operating a transaction terminal or cashier station typically logs into the system with a unique identification via his or her register (e.g. via a keyboard) to being processing transactions for customers. Once logged in, the system disclosed herein can performed as explained herein, and if a suspicious transaction is detected (e.g. a transaction count does not match a video count), the system can look at a past history of this particular cashier (based on their unique identity) that can be stored in a database that indicates how frequently this cashier performs transactions that are labeled as being suspicious. In this manner, if it is a rather infrequent occurrence, it may just be a mistake by the cashier (i.e. that person may have accidentally not scanned an item), whereas if the suspicious transaction history of that cashier indicates more frequent occurrences of suspicious transactions, this can be indicated in the suspicion level and can be used for subsequent processing (e.g. flagging the situation to a human operator for further review of the video).

In step 20 of FIG. 2, the transaction monitor 32 can assign a suspicion level to the segment of video 328. The suspicion level indicates a level of suspicion produced from automated video analysis of video data in comparison to transaction data. The transaction monitor 32 can adjust a suspicion level associated with the transaction outcome based on many factors. Examples include:

- An amount of difference between the transaction count and the video count. For example, out of 20 detected items, if 10 are not transacted by the operator, then the suspicion level is much higher than if only 1 of 20 items was not transacted.
- A history of an operator processing the transaction indicates that at least one former transaction has been identified for that operator that is indicated in the history as being suspicious. This example was discussed above.
- A number of regions of interest in which an item were detected within the video data. For example, if a non-transacted item is visually detected by every detector for every region, then the suspicion/confidence level is higher than if the non-transacted item is detected by only one detector for one region.
- A sequence of detection of an item in the video data within different regions of interest within the transaction area (e.g. item removal event followed by introduction event).
- A discrepancy between a video identification of an item within the video data in comparison to a transaction identification of the item obtained from the transaction data. The transaction identification may be, for example, the price of the item and/or identity of the item.
- A history of a register performing the transaction. This may indicate a faulty register, or this may indicate a register which is more prone to suspicious activity because of location or other factors.
- A history of other items identified in the transaction that may be indicative of an item in the transaction for which transaction data may not be required. As an example, if a salad is identified as an item, followed by a fork that is not scanned (and thus initially identified as suspicious), the suspicion level may be adjusted down to reflect the fork is free and does not need to be scanned.

Figure 3A:
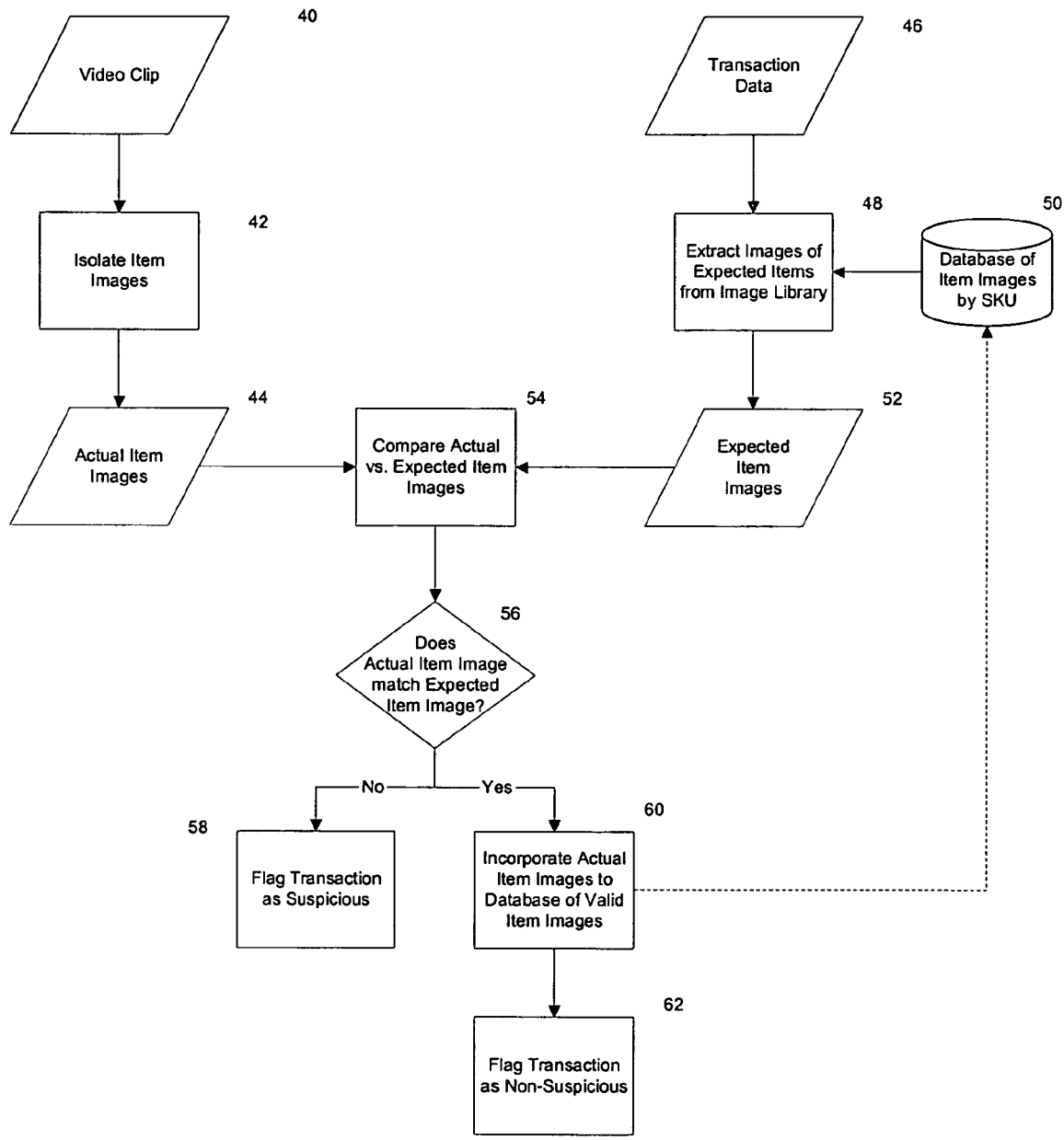
FIG. 3A is a flow chart of processing that the transaction monitor performs in an example configuration in which misidentified items are detected.

FIG. 3A is a flow chart of processing that the transaction monitor 32 performs in an example configuration in which misidentified items are detected. In this configuration, the video data 40 for one transaction and the corresponding Transaction Data 46 for that transaction are analyzed. Any time span of video and corresponding transaction data may be handled (i.e., at least a portion of or more than one transaction), but for the sake of clarity and simplicity, this example will discuss one transaction being handled at a time.

In step 42, the actual item images 44 are isolated from the video data 40. One method of image isolation is described as part of the removal/introduction detection method (discussed below). In step 48, the expected item images 52 corresponding to the items in the transaction data are extracted from a database of item images 50. The database of item images may be organized in any fashion, but one way that is convenient in a retail environment would be by SKU number.

In terms of the item image database, while the system disclosed herein can rely on a pre-populated database of images, the transaction monitor 32 can also populate the database with images as the transaction monitor 32 proceeds to isolate more images from each consecutive transaction. In this manner, the retailer is not required go through the time and expense to provide a database ahead of time. Instead, the database can be essentially learned by capturing and storing video of enough transactions with the same items.

In step 54, the actual item image is compared against an expected item image. It should be noted that the actual item images can be isolated and compared one at a time or as a group against their corresponding expected item images. In the case where the transaction data contains only a full list of items but no data with respect to the sequence or times at which they were scanned, there is no basis by which apriori correspondence between individual images can be established. Therefore the entire set of actual item images would need to be compared against the entire set of expected item images. If, however, sequence or timing transaction data is available that allows a synchronization process to associate scanned item data with video data (e.g. the timestamp of the scan is substantially synchronized with a timestamp of the video), then the correspondence between images can be established, e.g., the first actual item image is compared with the first expected item image, and so forth. In this case, the option exists to compare each individual actual item image against its one corresponding expected item image.

In step 56, if the images are found not to match, then transaction is flagged as suspicious in step 58. If, as mentioned above, the actual item images are being compared one-by-one against the expected item images, then the option exists to flag a specific item as suspicious rather than the entire transaction.

In step 60, if the images are indeed found to match, then the transaction is considered non-suspicious. The actual item image or images 44 may be incorporated into the database of item images (50) if desired. For example, it may not be desirable to introduce new images into a professionally pre-populated database, whereas it is necessary for a "learning" database. Regardless, in the next step 62, the transaction (or individual item as described above) would then be flagged as non-suspicious.

In this manner, the transaction monitor 32 performs image recognition of an item detected within the transaction area using automated video analysis to produce a video identity of an item. In doing so, the transaction monitor 32 obtains at least one transaction parameter by identifying an expected item identity of an item detected within the transaction area. The transaction monitor 32 then automatically compares the video parameter to the transaction parameter by comparing the video identity of the item to the expected identity of the item. If the video identity is different from the expected identity, the transaction monitor 32 indicates a transaction outcome that represents suspicious activity.

As discussed above, the items involved in a transaction can be counted within a particular region of interest or a combination of multiple regions of interest 302. Regions of interest may include any area where items of the transaction may be. In a typical supermarket shopping scenario, for example, the regions of interest may include the shopping cart 302-N, customer region 302-5, an incoming conveyor belt region 302-1 (i.e., object input region or area), scanning region 302-

2, and an outgoing conveyor belt 302-3 or bagging area (i.e., object output area), and operator region 302-4.

The operator may vary with the region of interest. For example, in the supermarket scenario, if items are being counted in the transfer from the cart 311 to the incoming belt region 302-1, then the customer 305 doing the transfer may be considered the operator. Similarly, if the cashier operator 308 is scanning the items at the transaction terminal 34, then the cashier 308 is considered the operator.

As discussed briefly above, in some configurations the counts across these regions of interest 302 are considered in combination to provide a more robust method of counting. For example, the number of detections across the incoming item input region 302-1, scanner or item read region 302-2, and bagging or other item output region 302-3 area in one configuration are compared to see if they coincide. If they do not, the average number of detections may be used. Likewise, the sequence of counts or detection events can also be taken into consideration. For example, each accurately counted item would be counted first at the incoming area as an item removal event, then at the scanner as a scan event, and then again at the bagging area as an item introduction event (each event or count being detected and produced by a detector analyzing that region of interest in the video data 320).

In another configuration, the count of the item is seen as a sequence or pattern of a certain type of event at a certain area, such as an object removal event when the operator removes an object from the belt or object input region 302-1, followed by another type of event such as an introduction event when the operator places the object into the object output region 302-3 or downstream conveyor belt. Thus a removal event (an operator picking up an object for scanning, and removing that object from the object input area) followed by an introduction event (the operator placing the item down on the output belt or object output area) is seen or interpreted by the system to be a video count.

If ever a count is registered only in one stage or region 302 (e.g. 302-1 item event detection) of the sequence but not the other one or two regions (no detection at regions 302-3 and/or 302-2), then that one count or event may be considered an error and/or may be labeled as suspicious. For example, if the video data is analyzed and the scan or transaction data is analyzed, the system can determine which scan detection events (i.e. transaction events) or scan counts match up with which video counts (e.g. a video count being, for example, an item removal event followed by an item introduction event if analyzing two regions, or if analyzing only a single region such as the item input region 302-1, then a video count or event can be a single removal event of an item 307 from that region 302-1 as detected by the video analysis). In such cases, if the scan counts or events match one to one with the video counts of events, there is no apparent fraudulent activity and the transaction is not flagged or labeled to further review. However, if, after time synchronizing the video data with the scan data (such time synchronization may be inherent in the data collection process when the video data is collected concurrently with the transaction or scan data, or may be done in post processing via algorithmic comparison of timestamps of scans with video frames or patterns of detection events), a pattern such as a removal event, followed by an introduction event (for a first object, with no scan or transaction event identifying the presence of the item in the transaction data), followed by another removal event (for a second object) is detected, then the transaction can be labeled as potentiality fraudulent or suspicious. In one configuration, the transaction monitor 32 correlates video timestamps of events from the analysis of the video data to transaction timestamps of items reflected as having been transacted in the transaction data to identify events indicating an item in the video data that does not have a corresponding record in the transaction data, thus indicating suspicious activity.

There are a number of methods which can be used individually or in combination with each other by which video analysis can be performed to identify an item count or detection event within one or more regions of interest 302.

One of such processing techniques disclosed herein is to count items currently in a region of interest. One way to count the items currently in the region of interest is to count the items visible in a static image of the region of interest. This assumes that the individual items can be segmented and disambiguated well, and this approach may therefore be particularly challenging in the case of connected or overlapped items. In a supermarket or other retail scenario, for example, a small number of items slowly placed on a moving conveyor belt one by one may indeed be spread out on the belt such that they do not touch or overlap with each other. In such a case, counting the items against the background of the belt from a static image of the belt yields the accurate number of items in the transaction. If, however, there is a large number of items on the belt, then the items may begin to pile up against each other at the end of the belt. As they pile up, segmentation of specific items via video analysis may become very difficult and analysis of a static image may yield poor results concerning a count of items placed on the belt.

In another configuration, the transaction monitor 32 can utilize counting of periods of activity. Periods of activity within the region of interest may indicate the introduction, removal, or passing through of an item. Activity measures include simple detection and measurement of motion in the region. A "tripwire" (i.e., looking for motion along an edge of the region of interest) can take into account the direction of entry into the region. In a supermarket scenario, for example, a tripwire along the customer facing end of the incoming belt area may be used to count each time a customer reaches in to place a new item on the belt in the item input region 302-1.

Two or more tripwires may be established and used to determine that motion of an item travels from one side of the region of interest across to another side of the region of interest. Around the scanner region 302-2 of a supermarket checkout, for example, two tripwires on either side of the scanner area can detect motion in a particular direction depending on the order in which they are triggered.

Another use of tripwires is to cover an entire large region of interest with a series of tripwires (perpendicular to the direction of motion of interest) to detect progression of motion from one end to the other. In a supermarket scenario, such a series of tripwires can be used to detect the forward progression of objects from the incoming area to the bagging area even as the objects are exchanged from one hand to another over the scanner area.

If an operator object (i.e. the portion of video data 320 containing the operator 308) can be identified from the image, then the count can increment only upon the operator object itself (e.g. his or her arm or hand) entering and exiting the region. By use of skin detection and/or by identifying the extremities of the operator object 308, the detector can be more accurate to trigger an item detection or count only if the operator's hand enters the region of interest (e.g. 302-1). If the end of the operator object (i.e., his or her hand) has as part of its color histogram colors other than its own, then it can be considered more likely to be a hand entering or exiting the region of interest with an item.

Figure 3B:
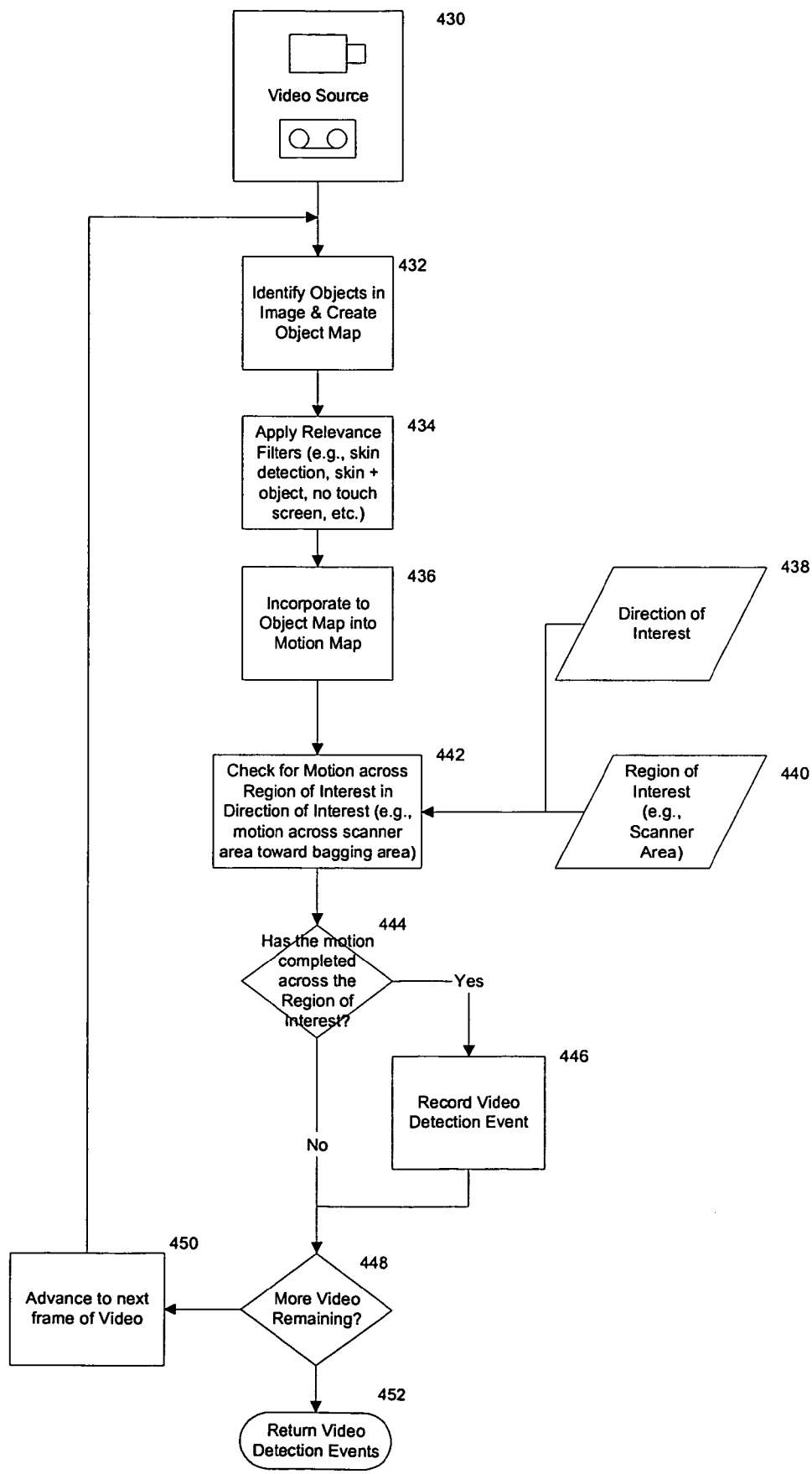
FIG. 3B shows one method of detecting activity in a region of interest to indicate presence of an item.

FIG. 3B shows one method of detecting activity in a region of interest to indicate presence of an item. From an image from video source 430, step 432 identifies objects and creates an object map. Step 434 applies relevance filters (e.g., skin detection, skin plus object color histogram, etc.) to make sure that only objects or activity of interest are being considered. For instance, in a video image of a retail store environment, an operator may reach across the scanner region in order to interact with the touch screen of the transaction terminal. Such activity in the region of interest is not indicative of item presence, and can therefore be ignored by filtering out cases where the operator object connects with the graphical region of the touch screen in the video image. Step 436 incorporates the current object map into a motion map of the motion over time in the image. Step 442 then analyzes the motion map to identify motion in the direction of motion 438 with the region of interest 440. If step 444 determines that the motion has completed all the way across the region of interest, then it is recorded as a video detection event in step 446. If step 448 determines that more video remains, then step 450 will advance to the next frame of video and continue from step 432. If not, then the records of video detection events is returned in step 452. As an example, with a direction of interest being from the item input region toward the item output region across the region of interest as the scanner area, the transaction monitor 32 could observe the scanner area for activity indicative of items present in the transaction.

In still other configurations, the transaction monitor 32 is able to count the introduction or removal of objects that may be items, or an operator or customer object. Objects being newly introduced or removed from one or more regions of interest 302 in one configuration is an indicator of item detection or count change. For example, in a supermarket scenario, if an item is removed from the incoming conveyor belt, or if it is introduced into the bagging area, (or both cases if considered in combination) then that indicates an additional item involved in the transaction.

One way to detect introduction or removal is to detect color histogram change in the region of interest. Another way to detect introduction or removal of an additional object (e.g. an item or an operator object) is to detect object appearance or disappearance. Such image detection algorithms as explained herein constantly incorporate static objects into the background image used for object segmentation. When a new object is added to the image, it will appear as the only one object in the foreground. Similarly, when an object is removed, it leaves behind a "ghost" (i.e., an alteration in the place of the image it once occupied) that will likewise appear as an object in the foreground. In either case, the object is subsequently counted and thereafter incorporated into the background to prepare for counting the next item.

One benefit of this method is that it readily facilitates isolation of an item image. When an object such as an item is introduced, that items image may be cut out as the isolated item image. When an item is removed (i.e., a ghost object appears), that item's image may be cut out from the frame that preceded removal. One challenge in the above kinds of methods is that the operator's arm itself will appear as an object in the region of interest. Two example configurations disclosed herein handle this challenge by either disregarding the operator's arm, or use only images without the arm in the region.

In order to disregard the arm object, it is first identified. This can be accomplished by checking all the objects in the video data to see which one extends (e.g. using edge detection) from the larger operator object 308 in the operator region 302-4 outside (or into) the region of interest 302-1. This object can then be assumed to be the arm of the operator 308. Skin detection may also be performed to further ensure that the object is indeed an arm and/or hand. Then the arm object may be removed from the region of interest's object map leaving only items of merchandise 307 that may have been introduced or removed. In order to use only images without the arm in the picture, a tripwire may be used along the edge of the region of interest closest to the operator 308 to see if any object is crossing it. If no object is crossing it in a particular frame of video, this indicates that the arm is not in the region of interest 302-1 in that frame. Using this logic, the frames before and after the entrance and exit of the arm can be isolated for determination of item presence. These frames can then be compared to identify item introduction or removal.

From the foregoing, the transaction monitor 32 is able to identify motion of an operator 308 within a region of interest (e.g. 302-1) in the transaction area that indicates the presence of an item 307 for transacting (e.g., for purchase) within the region of interest. The transaction monitor 32 can indicate if a record of the item occurs within transaction data corresponding to identifying the motion of the operator can automatically identify a situation when motion of the operator within the region of interest 302-1 in the transaction area indicates the presence of the item 307 for transacting, but the record of the item does not occur in the transaction data. In response, the transaction monitor 32 can indicate suspicious activity.

As noted above, modeling the operator such as the cashier 308 (or a customer 305 if the environment 300 in FIG. 1 is a self checkout terminal 34) can be used to identify the motion associated with handling each item 307 in the transaction. In a supermarket scenario with a top down view, for example, the operator may be modeled as a torso with two arms extending out from it. The torso of the operator can be identified by its location at the transaction terminal 34. The arms can then be identified as two faster moving extremities that extend from the torso. The handling of an item 307 may then be modeled as the extension of one hand to the incoming belt area or item input region 302-1, followed by the bringing together of the two hands as the item is passed from one hand to the other around the scanner area or region 302-2, then followed by the extension of the second hand toward the bagging area or item output region 302-3.

As mentioned above, either a single region of interest may be monitored with one item counting technique, or multiple counting methods may used in a region of interest 302 to achieve a count for items in that region 302. Similarly, the counts and sequence of counts from multiple regions of interest may be used in combination to achieve a more accurate count for the entire transaction.

Figure 4:
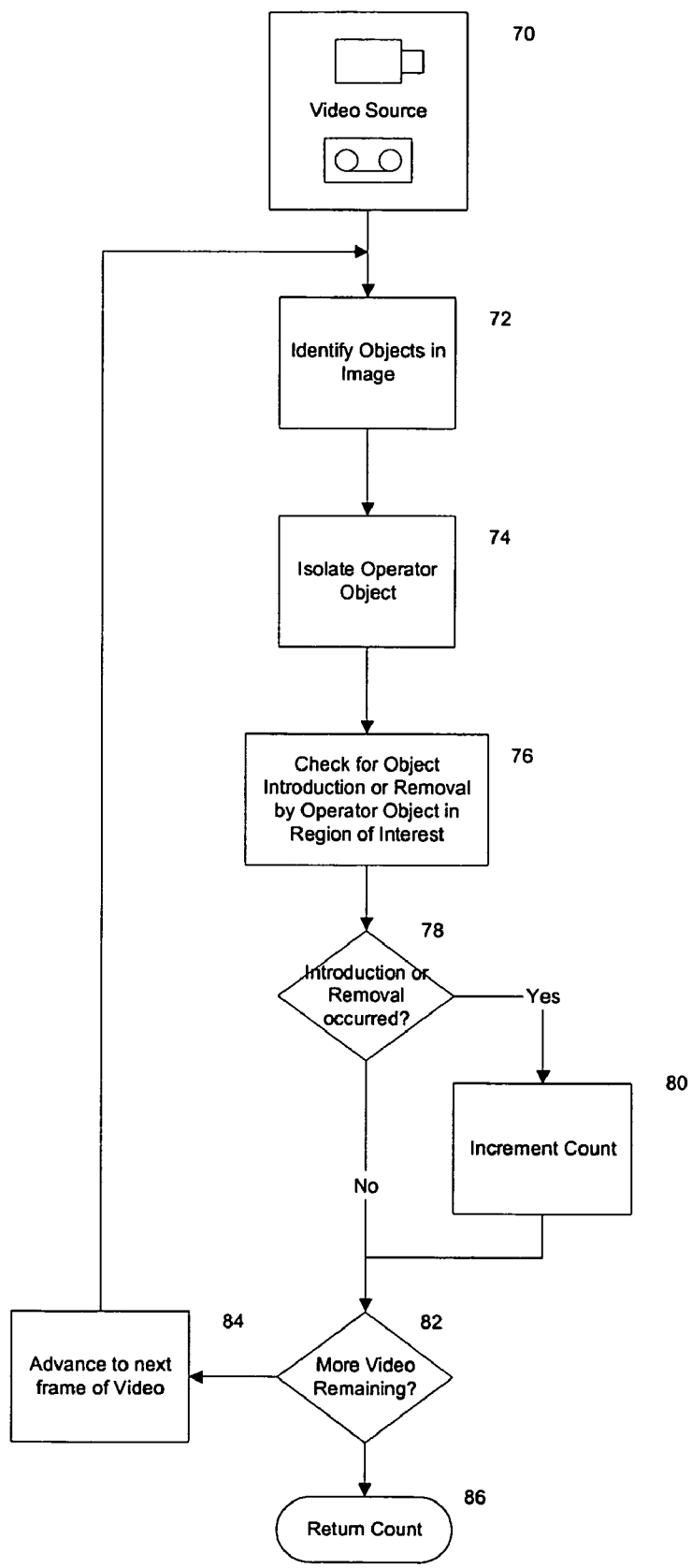
FIG. 4 shows processing that the transaction monitor performs in one configuration count items involved in a transaction using analysis of video data.

FIG. 4 shows processing that the transaction monitor 32 performs in one configuration count items involved in a transaction using analysis of video data 320. One way to count the presence of items is to count the operator's removal of items or introduction of items from or to a region of interest. For example, whenever an operator lets go of an item within a region of interest such as the bagging area, that item can be safely assumed to be an item of merchandise being introduced into the bagging area. Conversely, one way to count removal of items is to count the removal of the items from the item input region 302-1.

In FIG. 4, when the video source 70 outputs a frame of video, the first step 72 is to identify the objects within that image. One way this is typically done is by comparing the current frame against a model of the background so as to extract the foreground components, or the items, in the image. In the next step 74, the operator object (i.e. a rendition of the operator 308 in the video frame) is isolated. One way to do this is to use apriori information of the likely location of the operator 308. For example, if it is known that the operator 308 will stand in a particular confined location such as operator region 302-4, then it may be assumed that the largest moving object in that region is the operator 308. Another way to identify and isolate the operator object in video data is to identify the operator object reaching across the edge of the boundary of the region of interest 302-3 as the operator, for example, reaches into the bagging area to place another item 307.

The next step 76 checks for the graphical introduction or removal event, such as when the operator object and an item (or the object's ghost as described below) within the region of interest separate from one another graphically. A removal event indicates the operator has picked up an item in the item input region 302-1. In step 78, if the removal has occurred, then the count is incremented in step 80. In step 82, if there is more video remaining, then processing advances to the next frame of video in step 84, and the loop continues again with step 72. When video for the transaction is finished, the count is returned in step 86. In the case of item-by-item processing, each removal of an object from the item input area 302-1 (or introduction of an object into the item output area 302-3) creates a corresponding removal (or introduction) event that can then be correlated with the transaction data (or the pair can be correlated, if using multiple regions of interest).

Figure 5:
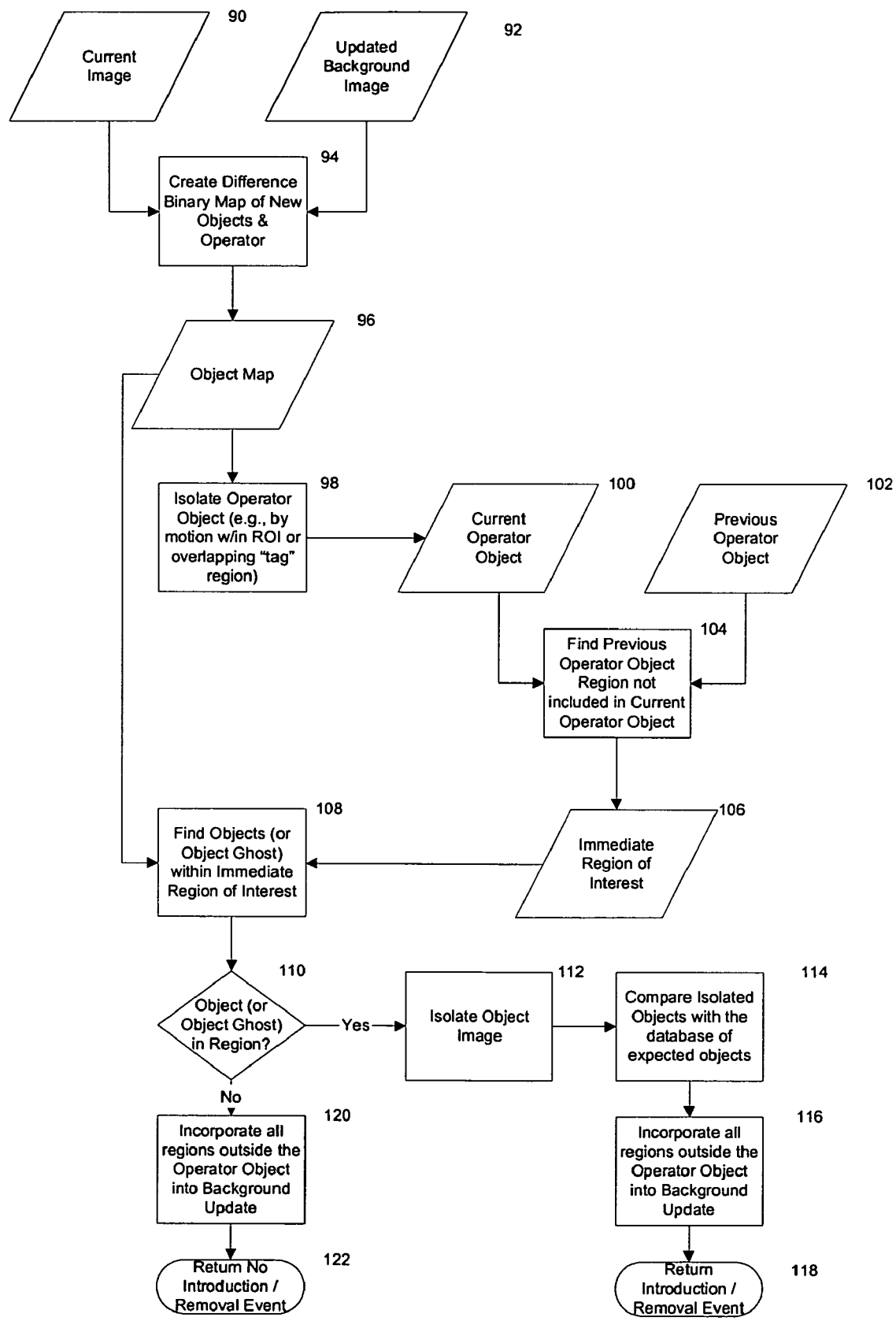
FIG. 5 illustrates one method of processing that the transaction monitor can perform to provide object removal and introduction event detection.

FIG. 5 illustrates one method of processing that the transaction monitor 32 can perform to provide object removal and introduction event detection. In FIG. 5, the current image 90 and an updated background image 92 is taken as input by step 94 in which they are compared (by subtraction and thresholding) to create a binary object map 96. This object map contains any new objects (i.e., items) in the image that are not part of the updated background, as well as the operator object which is also not part of the updated background. In the next step 98, the current operator object 100 is isolated from the object map. In a supermarket scenario where the cashier operator 308 stands in a defined space (e.g. region 302-4) before the register, this is done in one configuration by finding the largest moving object standing within the that space. (Alternatively, this can also be done by finding the object overlapping a smaller "tag" region which is likely to be touched by the operator.) This object is considered the operator object.

In step 104, the current operator object 100 and the previous operator object 102 are used to define an immediate region of interest 106. The non-overlapping region of the previous operator object makes up the immediate region of interest for the following reason: If an item were held by the operator 308 in a previous frame of video data, it would have been part of the previous operator object. Therefore, if that item were released in the current frame, it would have been left somewhere in the area of the previous operator object. And because it was released, it would not be part of the current operator object. Therefore, if an item were released since the previous frame, its object would appear in the region of the previous operator object that does not overlap with the current operator object. Likewise, if an item were picked up in the previous frame, its ghost (i.e., its absence where it was removed from the background layer) in this frame would appear in the same immediate region of interest described.

In the next step 110, the object map 96 is checked to see if there is a new object (i.e., item) or object (i.e., item) ghost that has appeared in the immediate region of interest 106. If not, then in the next step 120, all regions outside the operator object are incorporated into updating of the background to be used for the next frame. Lastly, the occurrence of no removal/introduction is returned.

In step 110, if there is indeed a new object in the Immediate Region of Interest, then the next step 112 is to isolate that object (i.e., item) image, i.e., copy it from the current frame. If an object removal (disconnection from ghost) is being detected, then the image is taken from a frame before the previous frame when the item was picked up.

In the next step 114, the isolated image of the actual item will be compared with the database of expected objects (e.g., a database of items along with their photographs). Note, this is part of the item misidentification detection method described above. Then the object image is incorporated into the updating of the background to be used for the next frame. Again, in the next step 116, all regions outside the operator object, including the removed or introduced object are incorporated into updating of the background to be used for the next frame. Lastly the occurrence of a removal (or introduction) is returned.

Figure 11:
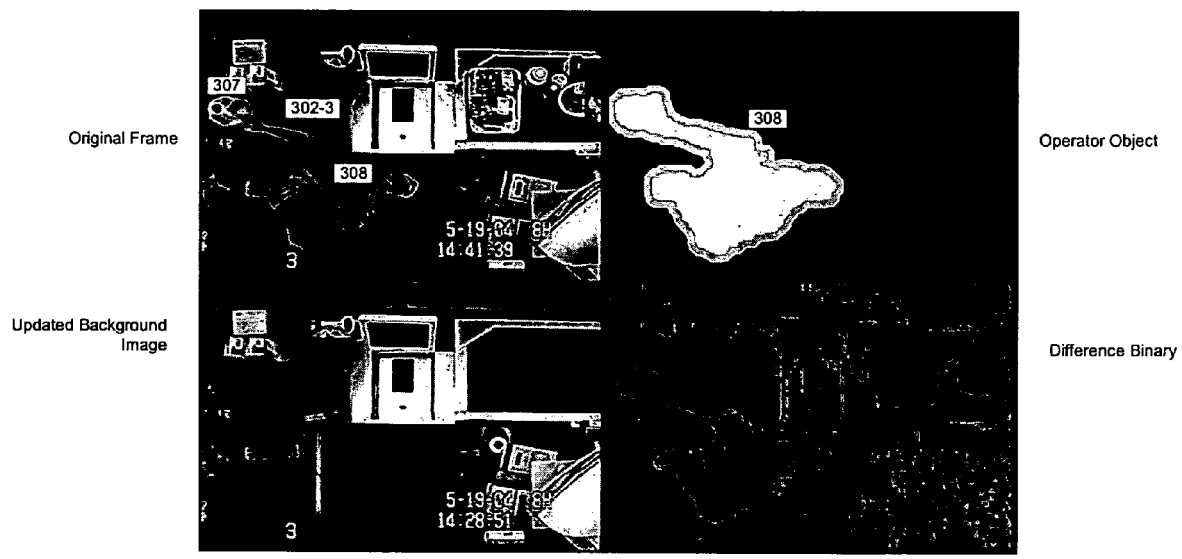
FIG. 11 illustrates example of frames of video data and that show the appearance of the transaction area before and after detection of an event.
Figure 11:
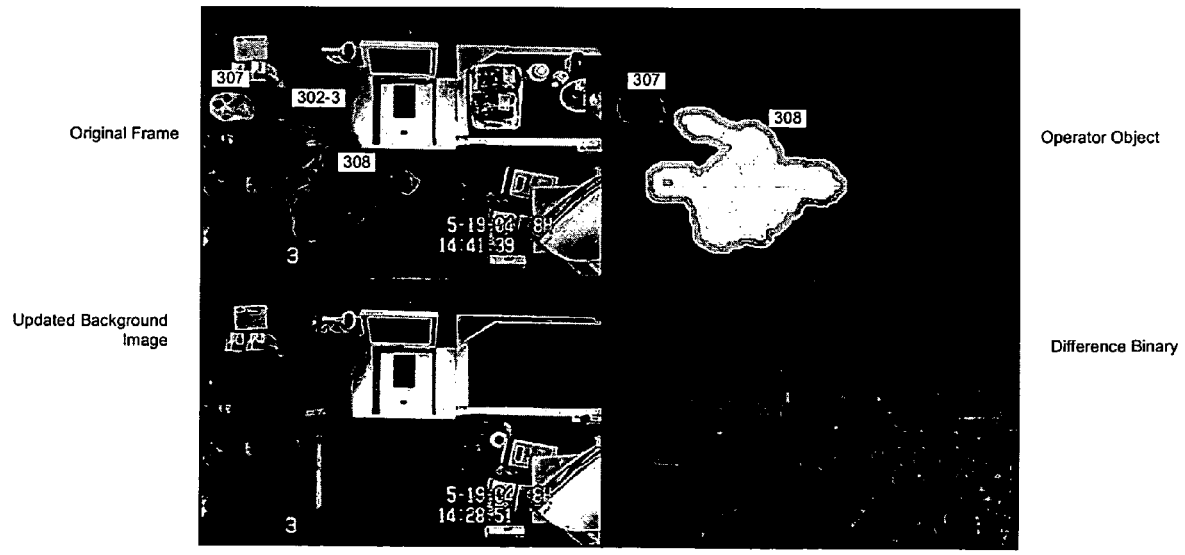

FIG. 11 illustrates example of frames of video data 501 and 502 that show the appearance of the transaction area 301 before (video data frame 501) and after (frames 502) detection of an event. The detected event in this example happens to be an introduction event in which the operator 308 places an item 307 (a milk jug in this example). Each frame 501 and 502 is divided into four quadrants, an upper right and left, and a lower right a left. The upper left quadrant of each frame shows the original frame of video data, wherein the lower left quadrant shows the updated background image, produced as explained via the above processing. The upper right quadrant of each frame 501 and 502 shows the operator object 308, and the lower right quadrant shows the difference binary image or map.

In the upper left quadrant of frame 501, it can be seen that the operator 308 has placed an item into the item output region 302-3 but has not yet released their hand from the item 307. In the corresponding quadrant in frame 502, the operator 308 has at that point released the item 307 as an introduction into the item output region 302-3. Notice the difference between the operator object 308 in the upper right quadrant of frame 501, in which the operator object is considered to include the item in the hand of the operator, as opposed to the upper right quadrant of frame 502 that contains the operator object 308, as well as the now separate item object 307. The video analysis as previously discussed can detect this difference in images and can indicate this activity as an item detection event, in this case an item introduction event, accounting for the existence of that item in the transaction. In this manner, the video analysis is able to detect items involved in the transaction, and as explained above, the transaction monitor 32 can use this information in comparison with transaction data from the transaction terminal 34 to ensure that each item detected in the video data has a corresponding entry (e.g. scan, read, item identify or price) in the transaction data. If this corresponding transaction data does not exist for this object, the transaction monitor 32 can indicate suspicious activity.

Note that for regions of interest with moving backgrounds, such as conveyor belts in supermarkets, a method for adapting the background image is detailed below in the discussion adaptation for moving backgrounds. The system can also incorporate bottom-of-basket detection or in-basket detection to identify from an elevated view items existing underneath or within a possibly moving shopping cart, for example.

As exampled above, the transaction monitor 32 in one configuration can analyze at least a portion of the video data by defining at least one region of interest within the video data and calculating the object map that identifies a change between a current image of the region(s) of interest and an updated background image of the region(s) of interest. Then, by isolating at least one operator object within the region(s) of interest, the transaction monitor 32 can detect if an analysis of the object map and the operator object identifies either the removal or introduction of an object to the region of interest 302. In this manner detection events can be maintained that indicate a count of presence of object in the video data. This can be done for a single region or for many regions 302, and can be done on an item by item basis or for larger portions of a transaction or for the entire transaction (i.e. all items).

In the process of analyzing at least a portion of video data, the system needs to compensate for autogain functionality found in some cameras or other video sources. Autogain seeks to balance the brightness in a camera's three color channels over the entire image. This could lead to unfortunate shifts in color if a large noisance object (i.e. an object appearing in the scene but not part of the transaction or transaction area) appears within the field of view of the camera. The system needs to essentially undo that shift in color. The challenge is that the system cannot compute any statistics over the entire image, as the system will arrive at the same conclusion that the camera's autogain came to. Instead, the system needs to restrict its focus to the transaction area, more importantly, to the objects in the transaction area that remained stationary but exhibit a color or brightness shift. One method of accomplishing this the following: The current image is compared (e.g., via subtraction and thesholding) from the current updated background image to get a noisy binary map of foreground/background pixels. The background pixels only are then used to compute the color statistics for the current image and the background image. These background pixels are used because they correspond to the same, static objects in the world, and they exhibit the color shift effect that needs to be correct for. Once the statistics the pixels labeled as background are computed, the change is applied to the current image to bring its colors into correspondence with the colors of the background image and therefore in correspondence with the rest of the images being processed by the system. Once this preprocessing step is done, the usual video processing steps proceed. In this way, the transaction monitor 32 can compensate for autogain being applied to the video source prior to video analysis.

For a configuration in which there are regions of interest being monitored for both removal and introduction of items, the transaction monitor 32 can define an object input region 302-1 as a first region of interest and can define an object output area 302-3 as a second region of interest. In this configuration, detecting an object removal event and/or an object introduction event can include detecting an object removal event when an operator removes an object from the object input area, and/or detecting an object introduction event when an operator places an object in the object output area. In response to detecting a removal event followed by an introduction event, the transaction monitor 32 can increment a video count as the at least one video transaction parameter in one configuration, or alternatively can generate respective events for the removal and introduction that are then processed during comparison to transaction data to identify items not in the transaction data but that appear in the video data.

In one configuration, at least one of the regions of interest includes a conveyor belt that translates a position of objects on the conveyor belt over time as captured within current and previous frames of video data. As an example, the item input area where removal detection events are generated as operator remove items 307 may be a conveyor belt that feeds the items 307 to the operator 308. In such cases, the transaction monitor 32 can compensate for the movement or translation of the items as they move from position to position in successive video frames. In particular, the transaction monitor 32 can analyze at least a portion of the video data and can include correlating previous and current frames of video data within the region of interest to determine an amount of translation of the position of objects on the conveyor belt. The transaction monitor 32 can account for the amount of translation of the position of objects on the conveyor belt when detecting object removal events and/or object introduction events.

Figure 8:
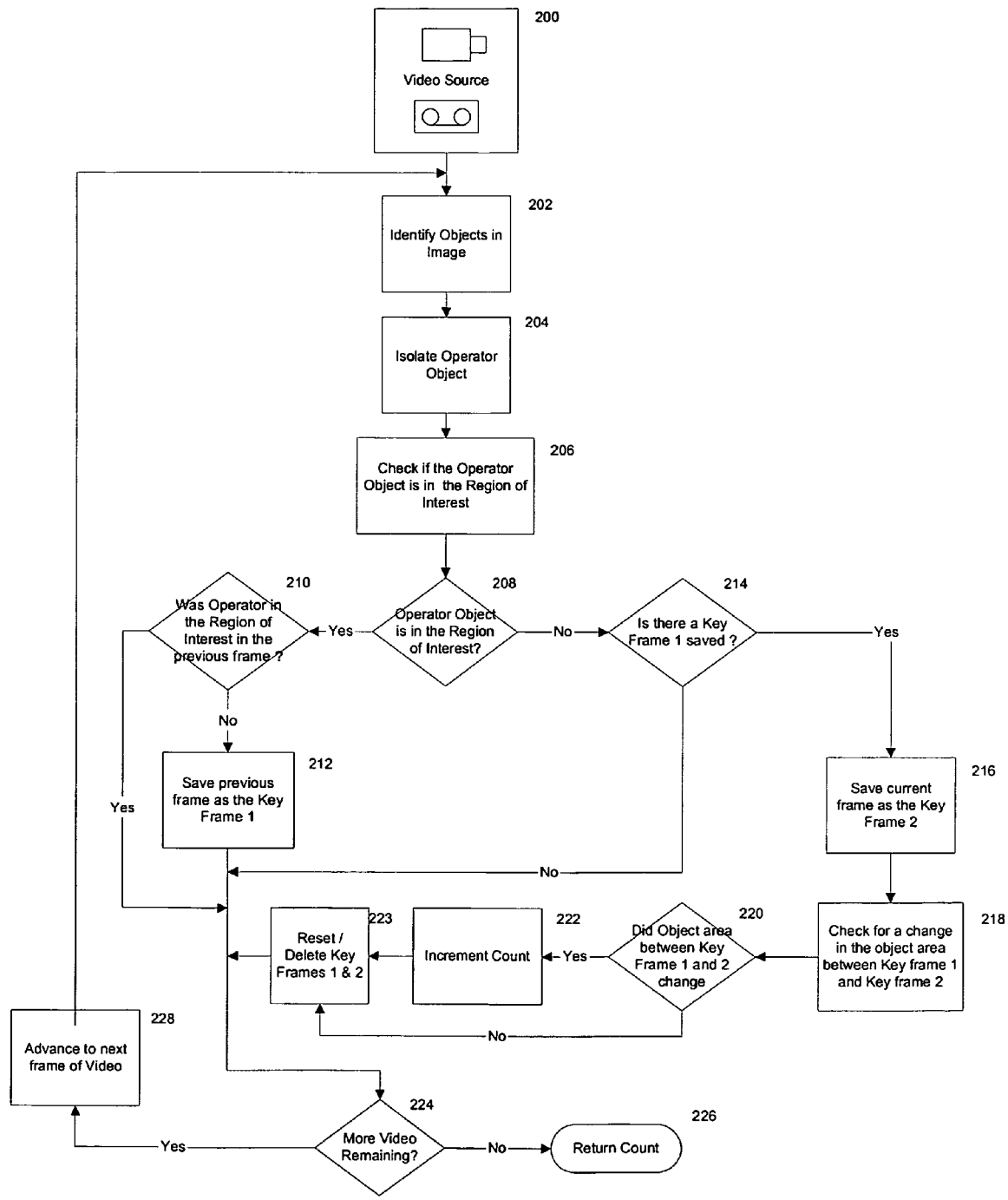
FIG. 8 is a flow chart of processing operations that the transaction monitor can perform to provide an area comparison method used by detectors when performing video analysis.

FIG. 8 is a flow chart of processing operations that the transaction monitor 32 can perform to provide an area comparison method used by detectors when performing video analysis.

When the video source 200 provides a frame of video, the Video Source (200) outputs a frame of video. The first step 202 is to identify the objects within that image of that frame. One way this is done is by comparing the current frame against a model of the background so as to extract the foreground components, or the objects, in the image.

In the next step 204, the operator object is isolated. One way to do this is to use apriori information of the likely location of the operator. For example, if it is known that the operator will stand in a particular confined location, then it may be assumed that the largest moving object in that location is the operator. Another way to do it would be to identify the object reaching across the edge of the boundary of the region of interest as the operator reaching into the bagging area to place another item.

In the next step 206, the system checks if the operator object extends into the region of interest. In the next step 208, if the operator object is in the region of interest, then the system checks, in step 210, if the operator was in the region of interest in the previous frame as well. If not, then the previous frame is saved in step 212 as the key frame 1. Key frame 1, therefore, is the image of the region of interest before the operator object entered the region of interest. When compared against the image of the region of interest after the operator object leaves the region of interest, the system will be able to determine whether a new object was introduced or removed from the region of interest. Regardless of the decision in step 210, the system will then proceed onto checking for more video in step 224.

If step 208 decides that the operator object is not in the region of interest, then step 214 checks if key frame 1 is already saved. If no, then that indicates that the operator object had not yet entered the region of interest as of the previous frame. And since the Operator Object is still not in the region of interest in the current frame either, it is not worth examining the region of interest for any new object introduction/removal by the Operator. The system then proceeds onto checking for more video in step 224.

If the decision in step 214 is yes, that indicates that operator object had previously already entered the region of interest and had not yet exited as of the last frame. Therefore, now that the operator object is not in the region of interest of any longer, the operator object must have just exited. Therefore, the current frame is saved in step 216 as key frame 2.

In step 218, the object areas for key frame 1 and key frame 2 are compared. This process is described in greater detail below.

If step 220 decides that there was indeed a substantive change (e.g., above a threshold amount) in the object area between key frames 1 & 2, then step 222 increments the item count or produces a detection event.

Regardless of the decision in step 220, the system proceeds to step 223 where it resets (or deletes) key frames 1 & 2 to signify that the operator object is no longer considered to be within the ROI.

The system then proceeds to step 224 to check if there is more video remaining. If no, then the item count is returned. If yes, step 228 advances the video the next frame and the system restarts the loop at step 202.

Figure 9:
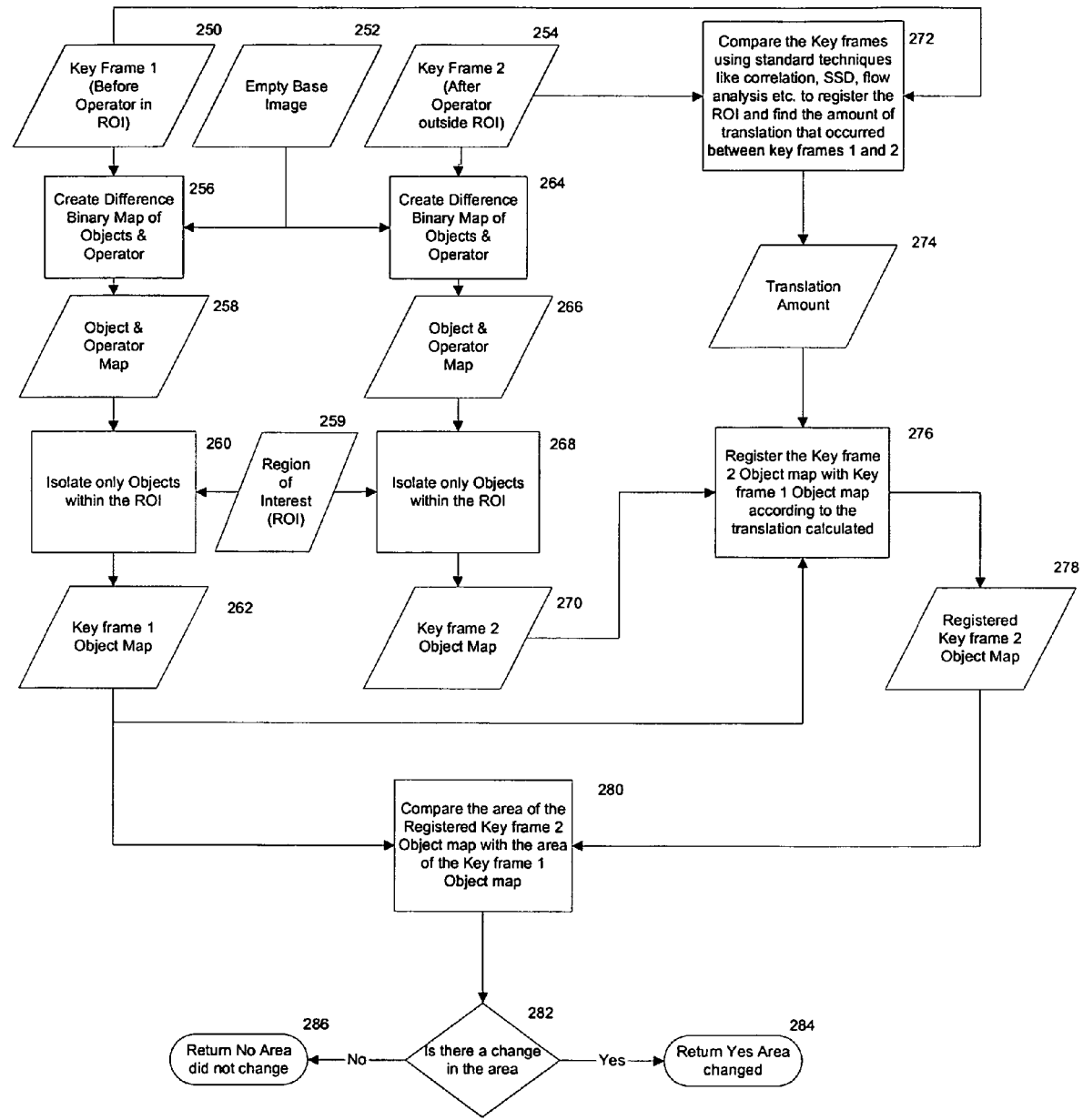
FIG. 9 is a flow chart of processing steps that the transaction monitor performs to provide key frame area comparison.

FIG. 9 is a flow chart of processing steps that the transaction monitor 32 performs to provide key frame area comparison. The diagram describes one example method by which two key frames can be compared to find change in the object area within the region of interest indicating object introduction or removal.

In this example, key frame 1 (250) is the frame of video before the Operator Object entered the region of interest. Key frame 2 (254) is the frame of video after the Operator Object has exited the region of interest. The Empty Base Image (252) is the image of the scene where the region of interest is without objects. The region of interest 259 is a binary map highlighting which region of the image is of interest.

Steps 256, 258, 260, and 262 describe processing related to key frame 1.

In step 256, key frame 1 and the empty base image are compared (by subtraction and thresholding) to create a binary object map 258. This object map contains any new objects in the image that are not part of the empty base image, including the operator object and other objects within the region of interest.

In step 260, the objects within the region of interest are isolated by taking the object map 258 and masking it with the region of interest 259, such that only the objects within the region of interest are left. One way to perform the masking is by performing an "AND" operation between the binary object map and the binary region of interest map. The new resulting object map is the key frame 1 object map 262.

Steps 264, 266, 268, and 270 perform the analogous creation of a key frame 2 object map 270 from key frame 2 254.

In step 272, the amount of translation within the region of interest between key frame 1 and key frame 2 is determined. This can be done so by using standard techniques like correlation, sum of squared differences, flow analysis etc. to register the region of interest and find the amount of translation that occurred between key frames 1 and 2. Step 272 produces a translation amount 274.

The translation amount 274 is applied by step 276 to register the key frame 2 object map 270 with the key frame 1 object map. The registered key frame 2 object map 278 is produced.

Step 280 compares the area of the key frame 1 object map 262 with the area of registered key frame 2 object map 278. The area of each of the object maps can be computed as the sum of the binary object map.

In step 282, if there was a significant enough change in the area (i.e., above a threshold), then return Yes that the area changed 284. Otherwise, return No, that the area did not change 286.

Figure 10:
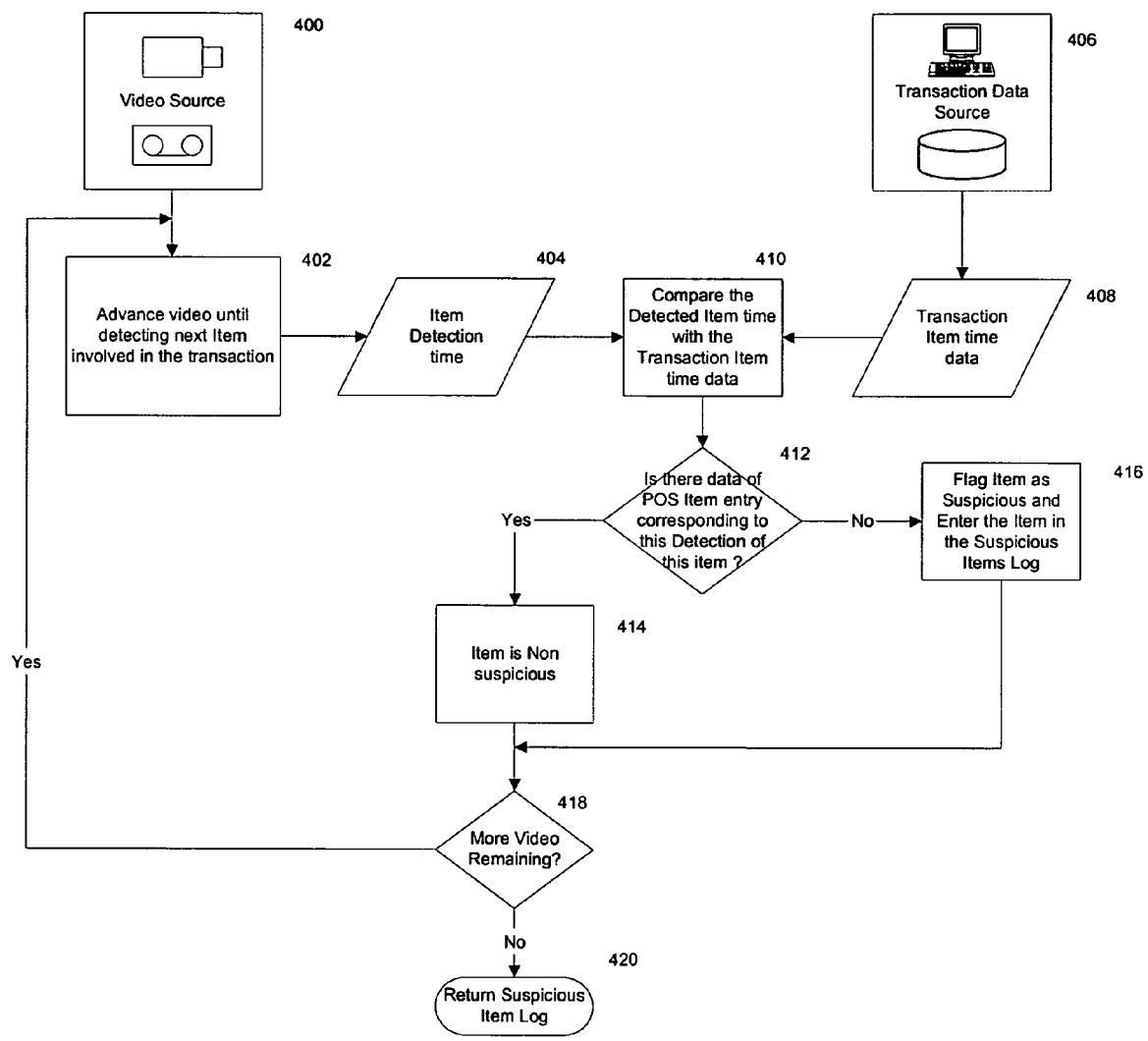
FIG. 10 is a flow chart of processing steps that describe transaction monitor processing that provides a passthrough item detection method.

FIG. 10 is a flow chart of processing steps that describe transaction monitor 32 processing that provides a passthrough item detection method. Just as passthroughs can be detected by comparing the expected and actual item counts over the time window duration of an entire transaction, so too is it the case that the time window can be of shorter be duration allowing the comparison to be done essentially on an item-by-item basis.

During the time window around each individual transaction item entry (i.e., scans, keyed-in entries, RFID reads, etc.), only one item is expected to be processed through the transaction. If the visual count is greater than one, then that indicates that suspicious activity has occurred. Similarly, during the time window around each individual actual visual item detection, there should be a corresponding POS item entry. If there is no POS entry, then it implies that the item actually processed was not expected according to the data, therefore signifying suspicious activity (e.g., a potential passthrough). This scenario is described in more detail below:

The item detection process 402 takes and advances video from the video source 400 until detecting the next item involved in the transaction. This can be done by any of variety of methods including but not limited to introduction removal detection, area difference comparison, scanner motion detection, etc. This produces an item detection time 404.

Next, in step 410, the system takes transaction item time data 408 from the transaction data source (406) and compares it with the item detection time 410. The comparison indicates whether or not there is a transaction item time that corresponds to the item detection time.

Step 412 checks the result of the comparison. If there is a transaction time corresponding to the item detection time, then the expected and actual activity match, and the current visually detected item is flagged as non-suspicious 414. If there is no transaction time corresponding to the item detection time, then the expected and actual activity have a discrepancy, and the current visually detected item is flagged as suspicious and entered into the suspicious item log 416.

Figure 12:
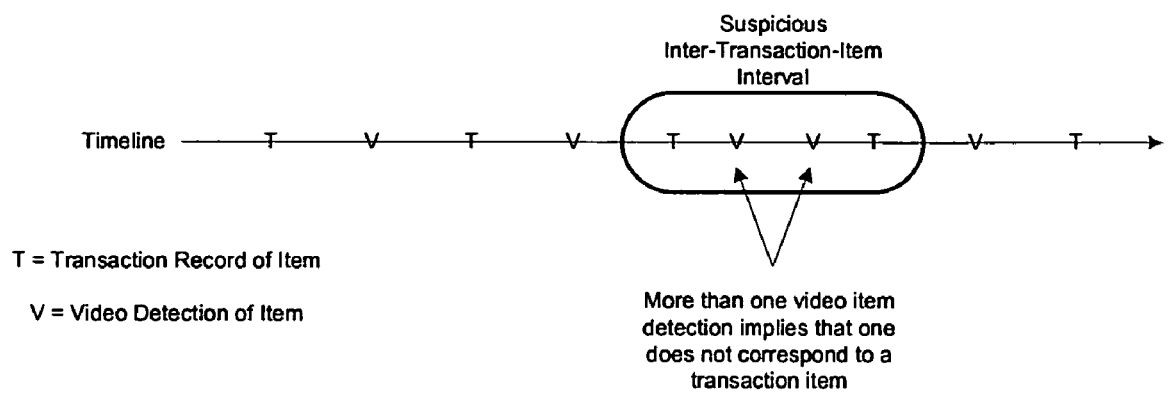
FIG. 12 is a timeline of events that demonstrates how the transaction manager can determine if there is more than one visual item detection present within the same inter-transaction-item interval.

One method by which correspondence can be determined is by whether an as yet uncorresponded transaction item time is present within a sufficiently close time (e.g., less than some static or dynamic threshold) of the item detection. If so, then the detection can be matched to a transaction time; if not, then the item detection is considered uncorresponded. Another method involves keeping a running tally of the total number of items detected as well as the total number of transaction items. When the detected items outnumber the transacted items by more than some threshold (e.g., more than one item), then the last detected item is considered uncorresponded, and the tallies are reset until the next uncorresponded item. Another method is to see if there is more than one visual item detection present within the same inter-transaction-item interval as in the example in FIG. 12. If so, then at least one of the item detections must not correspond to a transaction item time. In such a case, the inter-transaction-item interval itself may be considered suspicious.

In Step 418, if there is more video remaining, then system proceeds to step 402 to restart the loop. Otherwise, the system proceeds to step 420 to return a log of the suspicious items.

In this manner, the system provides a passthrough item detection method that can identify passthroughs as suspicious activity.

Other configurations include the ability to employ customer and/or employee presence and tracking. Such configurations can use an "over-the-shoulder" perspective camera shot in addition to the simpler top-down camera shot. In cases where the camera is behind where the cashier stands at the cash register looking over his or her shoulder at the counter, register and customer, the method can identify the employee as the object on the near side of the counter by identifying the object occluding the counter. Conversely, the customer object is identified as the object seen over the counter but cut off by the upper edge of the counter. In one configuration, once a customer or employee is identified, his or her location is tracked and labeled by the system.

Figure 6:
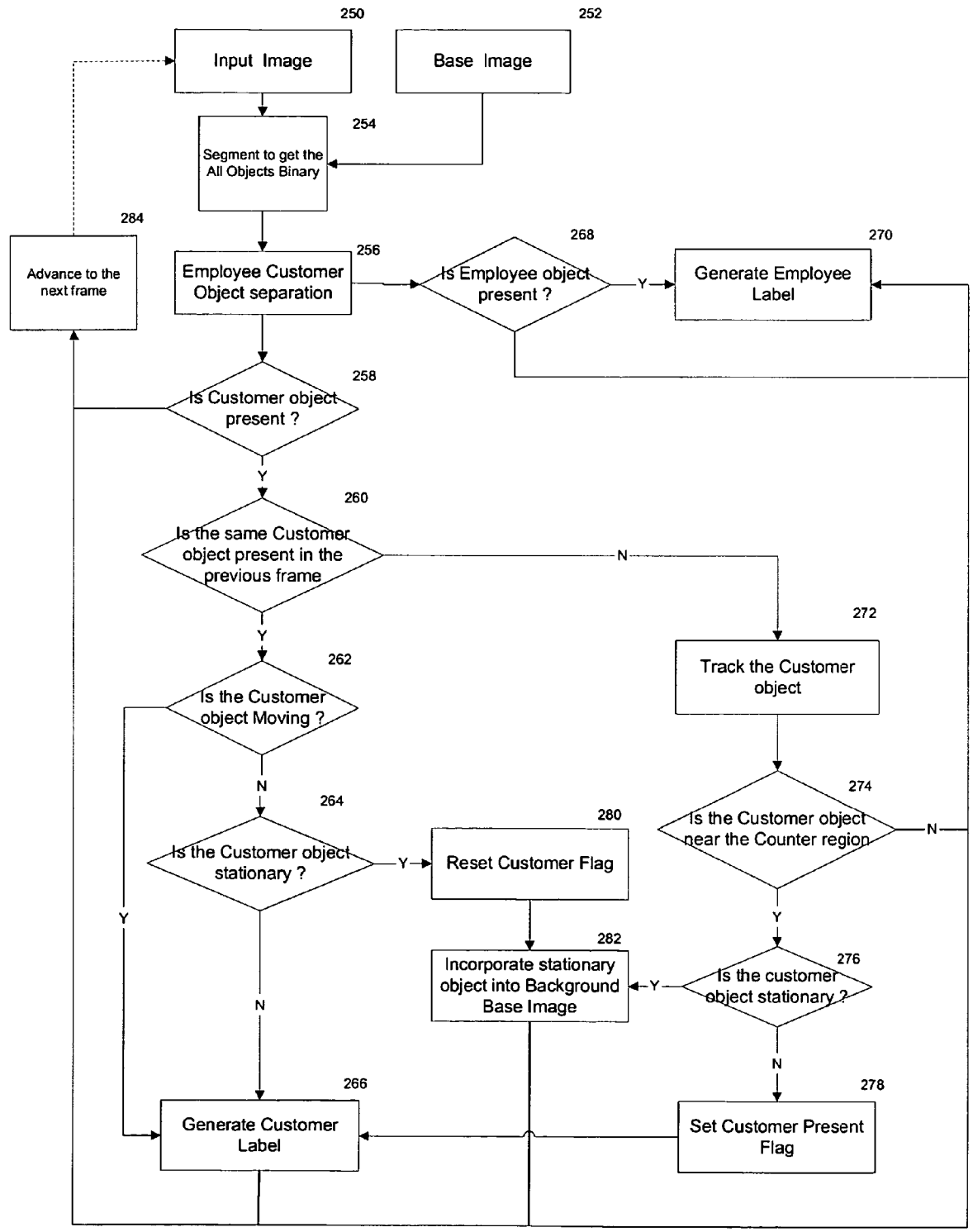
FIG. 6 is a flow chart showing processing steps that the transaction monitor employs in one configuration to provide customer and/or employee presence detection & tracking.

FIG. 6 is a flow chart showing processing steps that the transaction monitor 32 employs in one configuration to provide customer and/or employee presence detection & tracking. In step 254, the input image 250 and the background base image 252 are compared to produce an all objects binary map showing all non-background objects in the image. One typical method of such comparison is subtraction, followed by thresholding, followed by morphological operations to "clean" the binary map of noise. Next, in the next step 256, employee/customer object segmentation is performed on the all objects binary map as described in the following section and in FIG. 7 that described employee/customer object segmentation.

In step 268, if an employee object exists, then the employee object is labeled in step 270. In step 258, if a customer object does not exist, then the process will advance to the next frame of video in step 284. Otherwise, in step 260, if the same customer object is present in the previous frame, then step 262 will determine if the customer object is stationary over time. If so, then the customer object is actually probably an inanimate object such as shopping cart. In that case, the process resets the customer flag in step 280 and then incorporates the stationary object into the background base image in step 282. If the customer object is not stationary over time, then it is assumed to indeed be a human and the object is labeled as a customer in step 266. Stationary or not, the process then advances to the next video frame in step 284.

In step 260, if the same customer object was not present in the previous frame, then the customer object is tracked in step 272. The tracking is done by tracking shifts in the centroids of the objects of interest. If the customer object is near the counter region (e.g. 302-1, 302-2, 302-3), i.e., as if standing at the counter, then it is determined whether or not is a stationary object like a cart. If so, then the process shifts to step 282 as described previously. If not, then the customer present flag in step 278 and the customer is labeled in step 266.

Figure 7:
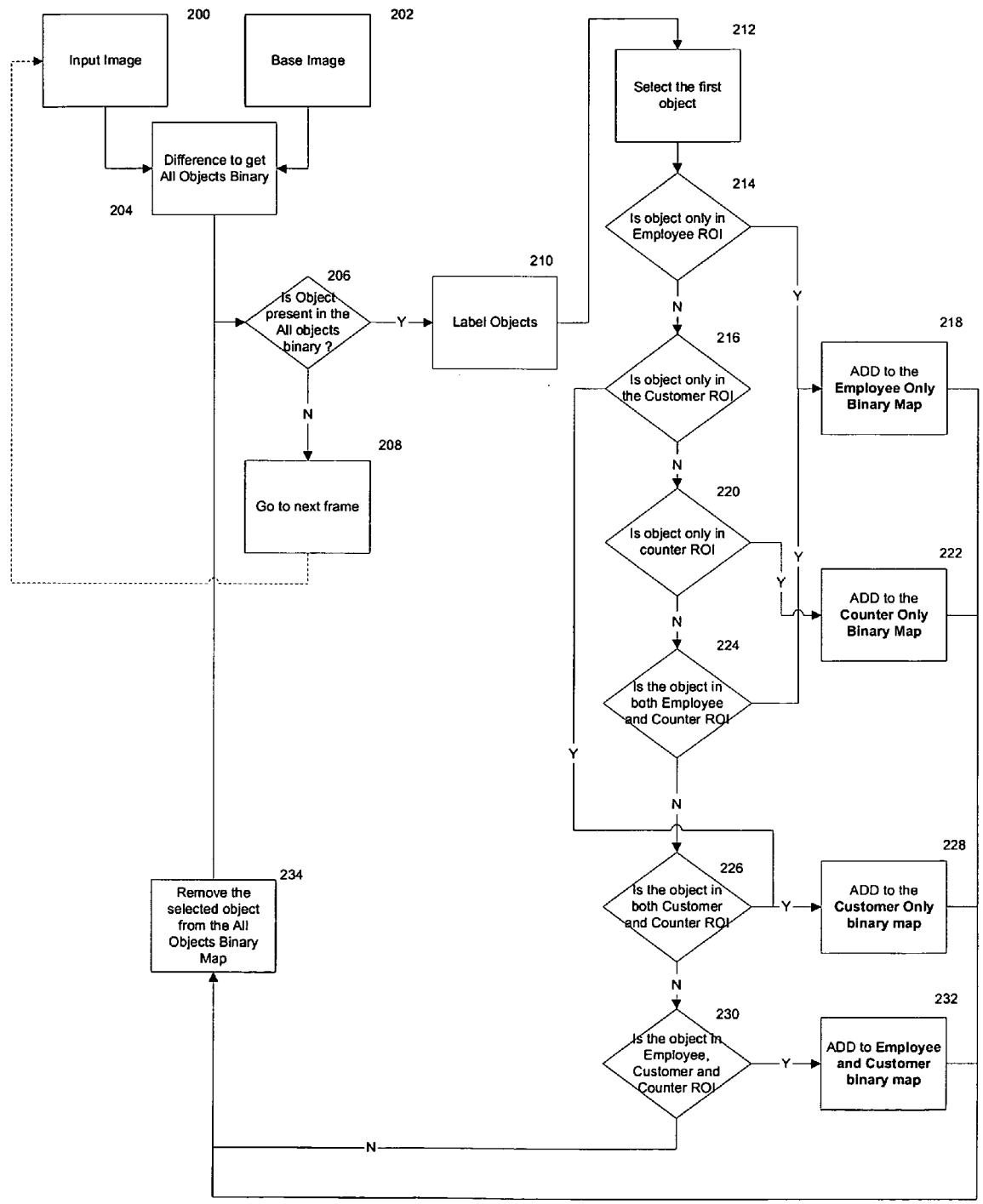
FIG. 7 is a flow chart of processing steps that show processing that the transaction monitor 32 performs to provide employee/customer object segmentation.

FIG. 7 is a flow chart of processing steps that show processing that the transaction monitor 32 performs to provide employee/customer object segmentation.

In step (204), the input image 200 and the background base image 202 are compared to produce the all objects binary map showing all non-background objects in the image. One typical method of such comparison is subtraction, followed by thresholding, followed by morphological operations to "clean" the binary map of noise.

In step 206, the binary object map is checked for having any objects present. If not, then step 208 advances video to the next frame and processing continues again from the beginning of the loop. In step 206, if objects are present in the binary object map, then they are undergo a labeling operation in step 210. Next, in step 212, the first labeled object is selected. In step 214, if the object is found to only fall in the employee region of interest 302-4, then the object is added to the employee only binary map in step 218. The employee region of interest 302-4 is typically the near side of the counter where only an employee or other operator (versus Customer or Item on the Counter) would appear.

In step 216, if the object is found to fall only in the customer region of interest 302-5, then the object is added to the customer only binary map in step 228. The customer region of interest 302-5 is typically just above the top edge of the counter top in the image where a customer would appear if standing at the counter.

Next, in step 220, if the object is found to fall on in the counter region of interest (e.g. 302-1, 302-2, or 302-3) (the counter top), then the object is likely to be an item on the counter and is added to the counter only binary map in step 222. In step 224, if the object appears in both the employee and counter regions of interest 302-4, and one or more of 302-1, 302-2 and 302-3, but not the customer region of interest 302-5, then the object is determined to be an employee or operator and is added to the employee only binary map in step 218.

In step 226, if the object is in both customer and counter region of interest 304-5 and one or more of 304-1, 302-2 or 302-3, but not the employee region of interest 302-4, then the object is considered to be a customer and is added to the customer only binary map in step 228.

In step 230, if the object is in all three regions (Employee 302-4, Customer 302-5, and Counter—one or more of 302-1, 302-2 and 302-3) then it may be a merged object of the employee image partially overlapping with the image with the customer. Therefore the object is added to the employee and customer binary map in step 232.

After the object has been processed, in step 234 it is removed from the all objects binary map so that the next labeled object can be processed.

In step 206, if there are still objects remaining in the all objects binary map, then processing continues on the next object in step 210. Otherwise, if all objects in the image have already been processed, the processing proceeds to the next frame of video in step 208.

In this manner, the system can identify an operator or customer object so as to be able to distinguish this object from item objects in the video analysis.

While the system and method have been particularly shown and described with references to configurations thereof, it will be understood by those skilled in the art that various changes in form and details may be made therein without departing from the scope of the invention encompassed by the appended claims. Accordingly, the present invention is not intended to be limited by the example configurations provided above.

What is claimed is:

1. A method of detecting suspicious activity, the method comprising:
   obtaining video data originating from at least one video camera that monitors a transaction area;
   analyzing the video data to track items involved in a transaction in the transaction area, wherein the step of analyzing comprises automatically analyzing frames of video from at least one region of interest in at least a portion of the video data to identify a respective event indicating the presence of an item associated with the transaction; and
   comparing the video analysis of the tracked items to transaction data produced from a transaction terminal to identify suspicious activity, wherein the step of comparing comprises analyzing a sequence of items identified as being transacted in the transaction from a transaction data in comparison to events produced from analysis of the video data to determine if the item represented by at least one event produced from the analysis of the video data is indicated as an item for transacting in the at least a portion of transaction data, and correlating video timestamps of events from the analysis of the video data to transaction timestamps of items reflected as having been transacted in the transaction data to identify events indicating an item in the video data that does not have a corresponding record in the transaction data.

2. The method of claim 1 wherein analyzing the video data to track items involved in a transaction comprises:
   automatically identifying the presence of an item involved in the transaction; and
   wherein comparing the video analysis of the tracked items to transaction data comprises:

determining if the presence of the item identified in the analysis of the video data has a corresponding presence in the transaction data, and if not, identifying the suspicious activity.

3. The method of claim 2 wherein automatically identifying the presence of an item involved in the transaction comprises at least one of:
   detecting item activity in the transaction area; and
   detecting operator activity in the transaction area 4. The method of claim 2 wherein automatically identifying the presence of an item involved in the transaction comprises at least one of:
   detecting removal of an item from a region of interest in the transaction area;
   detecting introduction of an item to a region of interest in the transaction area.

5. A method for detecting a transaction outcome, the method comprising:
   obtaining video data associated with a transaction area;
   analyzing at least a portion of the video data to obtain at least one video parameter concerning at least a portion of a transaction associated with the transaction area, wherein the step of analyzing comprises automatically analyzing frames of video from at least one region of interest in the at least a portion of the video data to identify a respective event indicating the presence of an item associated with the transaction;
   obtaining at least one transaction parameter originated from a transaction terminal associated with the transaction area, wherein the step of obtaining comprises analyzing at least a portion at transaction data from a transaction terminal, to identify a sequence of items identified as being transacted in the transaction; and
   automatically comparing the at least one video parameter to the at least one transaction parameter to identify a transaction outcome, wherein the step of automatically comparing comprises analyzing the sequence of items identified as being transacted in the transaction from the transaction data in comparison to the events produced from analysis of the video data to determine if the item represented by at least one event produced from the analysis of the video data is indicated as an item for transacting in the at least a portion of transaction data, and correlating video timestamps of events from the analysis of the video data to transaction timestamps of items reflected as having been transacted in the transaction data to identify events indicating an item in the video data that does not have a corresponding record in the transaction data.

6. The method of claim 5 wherein obtaining video data comprises:
   obtaining video data originating from at least one elevated video camera that monitors a transaction area; and
   wherein analyzing at least a portion of the video data comprises:
   analyzing the video data to track items involved in the transaction in the transaction area; and
   wherein automatically comparing the at least one video parameter to the at least one transaction parameter to identify a transaction outcome comprises:
   comparing the video analysis of the tracked items to transaction data produced from a transaction terminal to identify suspicious activity.

7. The method of claim 5 wherein analyzing at least a portion of the video data comprises:
   producing a set of detection events indicating detection of items by at least one detector within at least one region of interest of at least one portion of the video data;
   wherein automatically comparing the at least one video parameter to the at least one transaction parameter comprises:
   for each detector, comparing the set of detection events for that detector to at least a portion of transaction data to identify at least one apparent discrepancy in a number of items detected by that detector from a number of items indicated in the at least a portion of the transaction data; and
   identifying an overall suspicion level for the transaction based on apparent discrepancies identified by the at least one detector.

8. The method of claim 7 wherein each detector is a video processing algorithm applied to a region of interest of the video data of the transaction area, and wherein comparing the set of detection events comprises:
   concurrently comparing at least one set of detection events from at least one detector with the at least a portion of transaction data to identify a discrepancy in a number of items processed in the transaction area.

9. The method of claim 5 wherein analyzing at least a portion of the video data comprises:
   applying an automated machine-based video analysis technique to detect a video event of an item associated with the transaction area;
   wherein obtaining at least one transaction parameter concerning a transaction that occurs in the transaction area comprises:
   identifying transaction data indicating transaction events of items associated with the transaction area; and
   wherein automatically comparing the at least one video parameter to the at least one transaction parameter comprises:
   determining if the video event is not identified as a transaction event in the transaction data, and in response, identifying a specific segment of the video data that indicates where the video event not identified as a transaction event exists.

10. The method of claim 9 wherein identifying a specific segment of the video data comprises:
    transmitting the specific segment of video data that indicates where the video event not identified as a transaction event exists to a reviewer to review the segment of video data to review the suspicious activity of an operator with respect to transacting of items during the transaction.

11. The method of claim 10 wherein automatically comparing the at least one video parameter to the at least one transaction parameter comprises:
    assigning a suspicion level to the segment of video, the suspicion level indicating a level of suspicion produced from automated video analysis of video data in comparison to transaction data.

12. The method of claim 5 wherein analyzing at least a portion of the video data comprises:
    defining a region of interest within the transaction area;
    automatically identifying a first frame of video data that indicates a first set of items in the region of interest;
    automatically identifying a second frame of video data that indicates a second set of items in the region of interest, the first set of items being visually distinct from the second set of items; and automatically indicating the visual distinctness of the first set of items from the second set of items as an event indicating an item existed within the region of interest of the video data; and wherein obtaining at least one transaction parameter comprises:

obtaining transaction data associated with the transaction terminal associated with the transaction area, the transaction data indicating if the item was registered as a transaction item with the transaction terminal; and wherein automatically comparing the at least one video parameter to the at least one transaction parameter comprises:

identifying suspicious activity when the transaction data is missing transaction data for an item for which an event indicates the item existed within the region of interest.

13. The method of claim 5 wherein analyzing at least a portion of the video data comprises:

defining a region of interest within the transaction area;

automatically identifying a first set of items in the region of interest at a first time;

automatically identifying a second set of items in the region of interest at a second time, the first set of items being visually distinct from the second set of items; and automatically indicating the visual distinctness of the first set of items from the second set of items as an event indicating an item existed within the region of interest of the video data; and wherein obtaining at least one transaction parameter comprises:

obtaining transaction data associated with the transaction terminal associated with the transaction area, the transaction data indicating if the item was registered as a transaction item with the transaction terminal; and wherein automatically comparing the at least one video parameter to the at least one transaction parameter comprises:

identifying suspicious activity when the transaction data is missing transaction data for an item for which an event indicates the item existed within the region of interest.

14. The method of claim 5 wherein analyzing at least a portion of the video data comprises:

performing video analysis of video captured of the transaction area to automatically detect and produce a video count, for at least one of:

activity of objects that pass through the transaction area;

activity of objects within a specific region of interest within the transaction area;

activity of objects within a plurality of specific regions of interest within the transaction area;

activity of objects entering into specific regions of interest within the transaction area; and activity of objects exiting the specific regions of interest within transaction area.

15. The method of claim 14 wherein obtaining video data comprises:

obtaining video data from at least one region of interest of the transaction area that is substantially level with a scanner region in the transaction area, the video data including an indication of items for transacting within the transaction area;

wherein performing video analysis of video captured of the transaction area to automatically detect and produce a count of activity of object comprises at least one of:

detecting activity related to objects including at least one of a customer, an operator and an item within the transaction area, the activity indicating the presence of an item for transacting within the transaction area, and after detecting the activity, keeping a record of the presence of the item detected within the transaction area.

16. The method of claim 5 wherein analyzing at least a portion of the video data comprises:

performing image recognition of an item detected within the transaction area using automated video analysis to produce a video identity of an item; and wherein obtaining at least one transaction parameter comprises:

identifying an expected item identity of an item detected within the transaction area; and wherein automatically comparing the at least one video parameter to the at least one transaction parameter comprises:

comparing the video identity of the item to the expected identity of the item and if the video identity is different from the expected identity, indicating a transaction outcome that represents suspicious activity.

17. The method of claim 5 wherein automatically comparing the at least one video parameter to the at least one transaction parameter comprises at least one of:

detecting a transaction outcome that may be indicative of fraudulent activity associated with the transaction area; and detecting a transaction outcome that may be indicative of operator error associated with the transaction area.

18. The method of claim 5 wherein analyzing at least a portion of the video data comprises:

identifying motion of an operator within a region of interest in the transaction area that indicates the presence of an item for transacting within the region of interest; and wherein obtaining at least one transaction parameter comprises:

indicating if a record of the item occurs within transaction data corresponding to identifying the motion of the operator; and wherein automatically comparing the at least one video parameter to the at least one transaction parameter comprises:

identifying a situation when motion of the operator within the region of interest in the transaction area indicates the presence of the item for transacting but the record of the item does not occur in the transaction data, and in response, indicating suspicious activity.

19. The method of claim 5 wherein analyzing at least a portion of the video data comprises:

identifying a video count of items detected within the transaction area using video analysis; and wherein obtaining at least one transaction parameter concerning at least a portion of a transaction that occurs in the transaction area comprises:

identifying a transaction count of items within the transaction area by analyzing transaction data associated with at least a portion of the transaction; and wherein automatically comparing the at least one video parameter to the at least one transaction parameter comprises:

comparing the video count to the transaction count and if the video count is different from the transaction count, indicating a transaction outcome that represents at least one of a fraudulent transaction and operator error.

20. The method of claim 19 wherein automatically comparing the at least one video parameter to the at least one transaction parameter comprises:
adjusting a suspicion level associated with the transaction outcome, the suspicion level being adjusted on the basis of at least one of:
i) the amount of difference between the transaction count and the video count;
ii) a history of an operator processing the transaction indicates that at least one former transaction has been identified for that operator that is indicated in the history as being suspicious;
iii) a number of regions of interest in which an item were detected within the video data;
iv) a sequence of detection of an item in the video data within different regions of interest within the transaction area;
v) a discrepancy between a video identification of an item within the video data in comparison to a transaction identification of the item obtained from the transaction data, the transaction identification being at least one of price of the item and identity of the item;
vi) history of a terminal performing the transaction; and
vii) history of other items identified in the transaction that may be indicative of an item in the transaction for which transaction data may not be required;
viii) the set of items included in the transaction data.

21. The method of claim 5 wherein analyzing at least a portion of the video data comprises:
detecting removal of an item from a first region of interest in the video data;
detecting introduction of the item into a second region of interest in the video data after detecting removal of the item from the first region;
wherein obtaining at least one transaction parameter comprises:
obtaining transaction data produced by a transaction terminal; and
wherein automatically comparing the at least one video parameter to the at least one transaction parameter comprises:
comparing the transaction data to identify if the item for which removal and introduction was detected is present in the transaction data as an item for transacting, and if not, providing an indication of suspicious activity related to the item.

22. The method of claim 21 wherein analyzing at least a portion of the video data comprises:
in response to detection of removal of an item and detection of introduction of an item, incrementing a video count to indicate presence of the item associated with the transaction; and
wherein the method comprises:
repeating detecting removal of an item, detecting introduction of an item and incrementing a video count until a transaction is complete, the video count upon completion of the transaction indicating a total number of items identified in the transaction from analysis of the video data.

23. The method of claim 5 wherein analyzing at least a portion of the video data comprises:
defining at least one region of interest within the video data;
calculating an object map that identifies a change between a current image of the at least one region of interest and an updated background image of the at least one region of interest;
isolating at least one operator object within the at least one region of interest; and
detecting if an analysis of the object map and the operator object identifies at least one of the removal and introduction of an object to the at least one region of interest.

24. The method of claim 23 wherein analyzing the video data comprises:
applying image adjustment processing to the video data to compensate for an autogain characteristic across an entire area of the video data, the image adjustment processing restricting its application to a portion of a region of interest captured within the video data.

25. The method of claim 24 wherein applying image adjustment processing comprises:
restricting focus to objects in the transaction area that remain stationary and that exhibit at least one of a color shift and a brightness shift.

26. The method of claim 23 wherein defining at least one region of interest comprises:
defining an object input area as a first region of interest;
defining an object output area as a second region of interest; and
wherein detecting at least one of an object removal event and an object introduction event comprises:
detecting an object removal event when an operator removes an object from the object input area;
detecting an object introduction event when an operator places an object in the object output area; and
in response to detecting a removal event followed by an introduction event, incrementing a video count as the at least one video transaction parameter.

27. The method of claim 23 wherein at least one of the at least one region of interest includes a conveyor belt that translates a position of objects on the conveyor belt over time as captured within current and previous frames of video data; and
wherein analyzing at least a portion of the video data comprises:
correlating previous and current frames of video data within the region of interest to determine an amount of translation of the position of objects on the conveyor belt; and
accounting for the amount of translation of the position of objects on the conveyor belt when detecting at least one of an object removal event and an object introduction event.

28. The method of claim 23 wherein analyzing at least a portion of the video data comprises:
performing image comparison to determine if an image of an item associated with at least one of the introduction event and the removal event substantially matches a previously stored image of an item;
if the images do not substantially match, identifying the transaction as potentially including a label switching event indicating one of potential suspicious activity and potential operational error.

29. The method of claim 5 wherein analyzing at least a portion of the video data comprises:
dividing the transaction area into a plurality of regions through which objects move in sequence during at least a portion of a transaction;
performing automated video detection of an item as the items move through the plurality of regions in a sequence to obtain a pattern represented by the at least one video parameter, the pattern representing video events of items that moved through the plurality of regions during at least a portion of the transaction;

wherein obtaining at least one transaction parameter comprises:
obtaining a transaction data identifying items detected by a transaction terminal during at least a portion of the transaction; and
wherein automatically comparing the at least one video parameter to the at least one transaction parameter comprises:
determining if the pattern representing video events of items from at least a portion of the transaction indicates a discrepancy from the transaction data identifying items detected by the transaction terminal during the at least a portion of transaction, and if so, identifying the transaction outcome to be a suspicious transaction.

30. The method of claim 29 wherein performing automated video detection of the items comprises:
identifying a removal event in an item input region that indicates an operator has removed an item from the item input region; and
identifying an introduction event in an item output area that indicates an operator has placed an item into the item output region.

31. A method for identifying suspicious retail transaction activity, the method comprising:
collecting elevated video data from a transaction area including a transaction terminal in which customers transact items during a transaction;
applying automated video analysis to at least a portion of the elevated video data to detect the presence of at least one item associated with the transaction, wherein the step of applying comprises automatically analyzing frames of video from at least one region of interest in at least a portion of the video data to don lily a respective event indicating the presence of an item associated with the transaction;
comparing the presence of at least one item associated with the transaction from the video data to transaction data indicating items actually transacted by the customer at the transaction terminal to identify items in possession of the customer that were not transacted at the transaction terminal, wherein the step of comparing comprises analyzing a sequence of items identified as being transacted in the transaction from a transaction data in comparison to events produced from analysis of the video data to determine if the item represented by at least one event produced from the analysis of the video data is indicated as an item for transacting in the at least a portion of transaction data, and correlating video timestamps of events from the analysis of the video data to transaction timestamps of items reflected as having been transacted in the transaction data to identify events indicating an item in the video data that does not have a corresponding record in the transaction data.

32. A system for identifying suspicious retail transaction activity, the system comprising:
at least one elevated video source operable to capture video data of a transaction area;
at least one transaction terminal operable to obtain transaction data from items when the items are placed within a proximity to the transaction terminal during a transaction; and
a transaction monitor operable to obtain the video data originating from at least one elevated video camera and to automatically analyze the video data to track items involved in a transaction in the transaction area, wherein the transaction monitor is operable to automatically analyze frames of video from at least one region of interest in at least a portion of the video data to identify a respective event indicating the presence of an item associated with the transaction and to compare the video analysis of the tracked items to transaction data produced from a transaction terminal to identify suspicious activity related to items, wherein the transaction monitor is operable to analyze a sequence of items identified as being transacted in the transaction from a transaction data in comparison to events produced from analysis of the video data to determine if the item represented by at least one event produced from the analysis of the video data is indicated as an item for transacting in the at least a portion of transaction data and wherein the transaction monitor is operable to correlate video timestamps of events from the analysis of the video data to transaction timestamps of items reflected as having been transacted in the transaction data to identify events indicating an item in the video data that does not have a corresponding record in the transaction data.

33. A method of detecting suspicious activity, the method comprising:
analyzing video data from a video camera to track items involved in a transaction in a transaction area of the point of sale terminal, wherein the step of analyzing comprises automatically analyzing frames of video from at least one region of interest in at least a portion of the video data to identify a respective event indicating the presence of an item associated with the transaction;
recording transactions of the point of sale terminal; and
detecting a suspicious activity upon a lack of correlation between items tracked by analyzing the video data and the recorded transactions of the point of sale terminal, wherein the step of detecting comprises analyzing a sequence of items identified as being transacted in the transaction from a transaction data in comparison to events produced from analysis of the video data to determine if the item represented by at least one event produced from the analysis of the video data is indicated as an item for transacting in the at least a portion of transaction data, and correlating video timestamps of events from the analysis of the video data to transaction timestamps of items reflected as having been transacted in the transaction data to identify events indicating an item in the video data that does not have a corresponding record in the transaction data.

* * * * *